United States Patent
Nonoyama et al.

(10) Patent No.: US 11,248,104 B2
(45) Date of Patent: Feb. 15, 2022

(54) TEMPERATURE-RESPONSIVE GEL HAVING LCST WITH NO VOLUME PHASE TRANSITION, AND PRODUCTION METHOD THEREFOR

(71) Applicant: National University Corporation Hokkaido University, Sapporo (JP)

(72) Inventors: Takayuki Nonoyama, Sapporo (JP); Jian Ping Gong, Sapporo (JP); Yong Woo Lee, Sapporo (JP); Kumi Ota, Sapporo (JP)

(73) Assignee: NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 125 days.

(21) Appl. No.: 16/471,224

(22) PCT Filed: Dec. 20, 2017

(86) PCT No.: PCT/JP2017/045768
§ 371 (c)(1),
(2) Date: Jun. 19, 2019

(87) PCT Pub. No.: WO2018/117165
PCT Pub. Date: Jun. 28, 2018

(65) Prior Publication Data
US 2020/0087485 A1 Mar. 19, 2020

(30) Foreign Application Priority Data
Dec. 20, 2016 (JP) .............................. JP2016-246385

(51) Int. Cl.
*C08K 5/098* (2006.01)
*C08J 3/075* (2006.01)

(52) U.S. Cl.
CPC .............. *C08K 5/098* (2013.01); *C08J 3/075* (2013.01); *C08J 2333/02* (2013.01)

(58) Field of Classification Search
CPC ........ C08K 5/098; C08J 2333/02; C08J 3/075
See application file for complete search history.

(56) References Cited

FOREIGN PATENT DOCUMENTS

| JP | 2002020318 A | 1/2002 |
|---|---|---|
| JP | 2005239860 A | 9/2005 |
| JP | 2009270048 A | 11/2009 |
| JP | 2011511136 A | 4/2011 |
| WO | 2009097420 A2 | 8/2009 |
| WO | 2015068837 A1 | 5/2015 |

OTHER PUBLICATIONS

Henderson et al., Ionically Cross-Linked Triblock Copolymer Hydrogels with High Strength. Macromolecule 2010, 43, pp. 6193-6201 (Year: 2010).*
Extended European Search Report dated May 14, 2020 in EP Application No. 17884942.8.
Henderson et al., "Ionically Cross-Linked Triblock Copolymer Hydrogels with High Strength," Macromolecules, vol. 43, pp. 6193-6201 (2010).
Iannuccelli et al., "Wet Treatments of Works of Art on Paper with Rigid Gellan Geis," The Book and Paper Group Session, AIC 38th Annual Meeting, vol. 29, pp. 25-39 (2010).
Julian et al., "Permeability characteristics of calcium alginate films," Journal of Controlled Release, vol. 7, pp. 165-169 (1988).
Nonoyama et al., "Instant Thermal Switching from Soft Hydrogel to Rigid Plastics Inspired by Thermophile Proteins," Advanced Materials, vol. 32, No. 4, pp. 1-7 (2020).
Rianasari et al., "A Chemical Template for Synthesis of Molecular Sheets of Calcium Carbonate," Scientific Reports, vol. 6, pp. 1-10 (2016).
International Preliminary Report on Patentability dated Jun. 25, 2019 in International Application No. PCT/JP2017/045768.
International Search Report dated Mar. 6, 2018 in International Application No. PCT/JP2017/045768.

* cited by examiner

*Primary Examiner* — Robert D Harlan
(74) *Attorney, Agent, or Firm* — Panitch Schwarze Belisario & Nadel LLP

(57) ABSTRACT

A temperature-responsive hydrogel which contains a carboxyl group-bearing polymer and a divalent-metal salt of an organic acid is provided. The carboxyl group-bearing polymer may be a homopolymer of a carboxyl group-bearing monomer or a copolymer of a plurality of monomers including the monomer. A method for producing the temperature-responsive hydrogel involves immersing a carboxyl group-bearing polymer in an aqueous solution of a divalent-metal salt of an organic acid. The concentration of the divalent-metal salt of an organic acid in the aqueous solution may be 50 mM to the saturation concentration. It is possible to provide a temperature-responsive gel having an LCST with no volume phase transition and a method for producing the temperature-responsive gel.

15 Claims, 26 Drawing Sheets

Fig.1
Method for producing
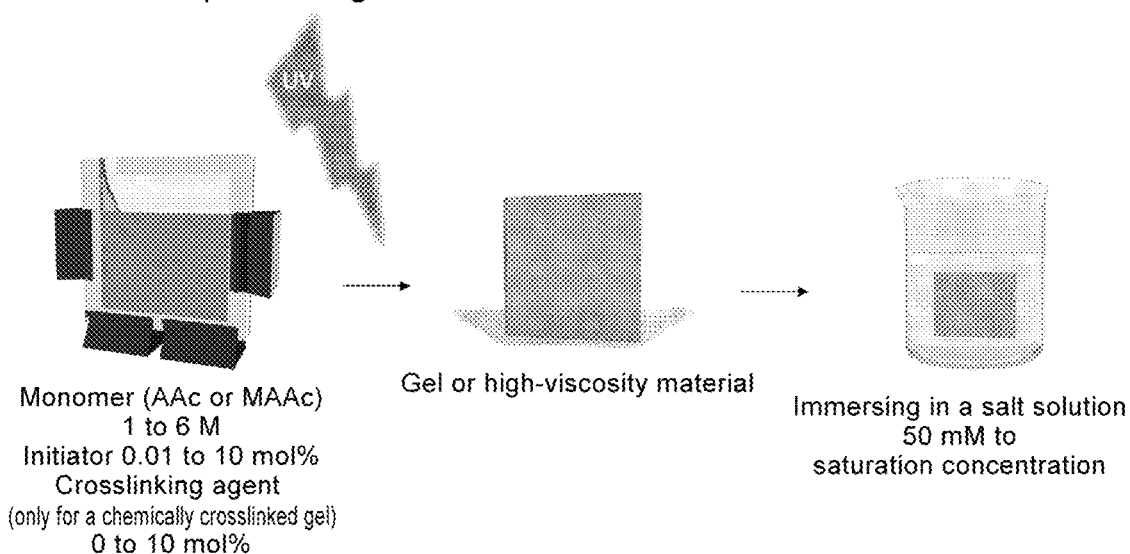
Monomer (AAc or MAAc)
1 to 6 M
Initiator 0.01 to 10 mol%
Crosslinking agent
(only for a chemically crosslinked gel)
0 to 10 mol%
Gel or high-viscosity material
Immersing in a salt solution
50 mM to
saturation concentration
Fig.2
Below LCST
(at room temperature)
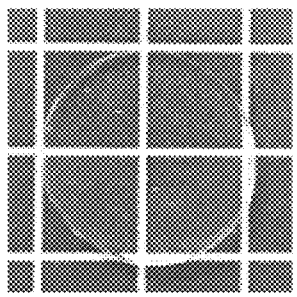
Above LCST (at 50°C)
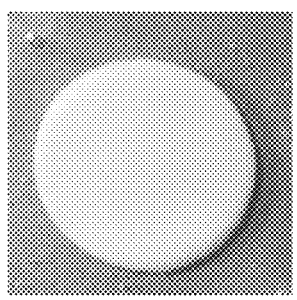
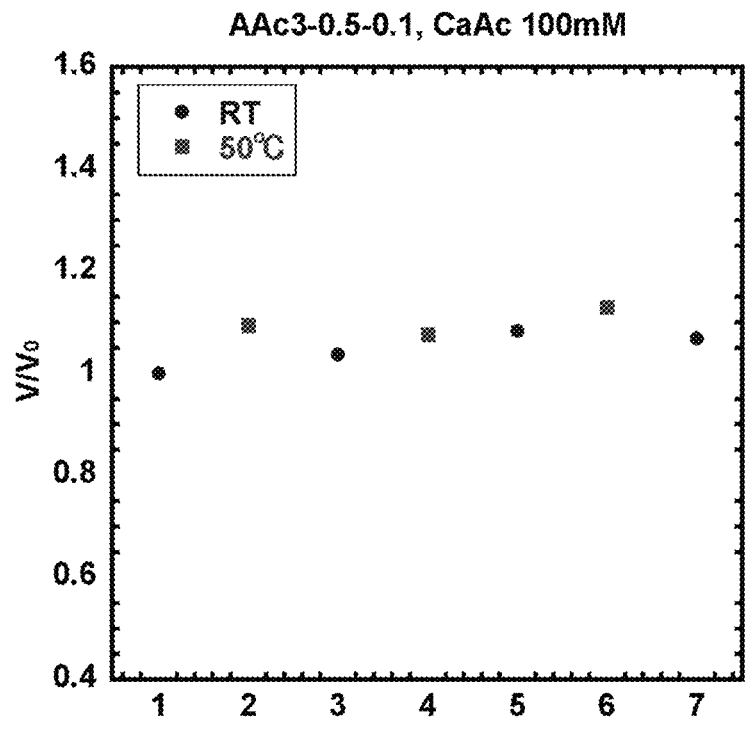

- Absorbance at 20°C is 0
- Adjusted value so that thickness become 1cm

| | E / MPa | $\sigma_{max}$ / MPa | $\lambda_{max}$ | WoE / MJ·m$^{-3}$ |
|---|---|---|---|---|
| 25 °C | 1.480 | 2.344 | 8.072 | 9.972 |
| 37 °C | 21.192 | 7.712 | 5.180 | 16.205 |
| 50 °C | 39.471 | 9.018 | 1.716 | 5.273 |

TEMPERATURE-RESPONSIVE GEL HAVING LCST WITH NO VOLUME PHASE TRANSITION, AND PRODUCTION METHOD THEREFOR

CROSS REFERENCE TO RELATED APPLICATION

This application is a Section 371 of International Application No. PCT/JP2017/045768, filed Dec. 20, 2017, which was published in the Japanese language on Jun. 28, 2018, under International Publication No. WO 2018/117165 A1, which claims priority under 35 U.S.C. § 119(b) to Japanese Application No. 2016-246385 filed Dec. 20, 2016, the disclosures of which are incorporated herein by reference in their entirety.

Technical Field

The present invention relates to a temperature-responsive gel having an LCST that does not exhibit a volume phase transition, and relates to a method for producing same.

Background Art

Poly(N-isopropylacrylamide) [poly(NIPAAm)] is known to be a typical example of a temperature-responsive polymer. Poly(NIPAAm) exhibits a lower critical solution temperature (LCST), which is a phenomenon in which solubility in an aqueous solution is exhibited at lower temperatures while precipitation (phase separation) occurs at higher temperatures.

A volume phase transition is also known to occur with poly(NIPAAm) hydrogels. Application to drug delivery systems utilizing this property has been proposed (PTL 1, the entire contents of which are specifically cited herein by reference).

CITATION LIST

Patent Literature

PTL 1: Japanese Patent Application Laid-open No. 2002-20318

SUMMARY OF INVENTION

Technical Problem

While applications that use the volume phase transition are interesting, a problem has been that, depending on the application, the use of materials that undergo a change in dimensions may be infeasible, for example, in the case of use for a structural material.

The present invention therefore addresses the problem of providing a temperature-responsive gel having an LCST that does not exhibit a volume phase transition, and a method for producing same.

Solution to Problem

The present invention is as follows.

[1]
A temperature-responsive hydrogel comprising a carboxyl group-bearing polymer and a divalent metal salt of an organic acid.

[2]
The temperature-responsive hydrogel according to [1], wherein the carboxyl group-bearing polymer is a homopolymer of a carboxyl group-bearing monomer or a copolymer of a plurality of monomer species that includes the carboxyl group-bearing monomer.

[3]
The temperature-responsive hydrogel according to [2], wherein the carboxyl group-bearing monomer is at least one selected from the group consisting of acrylic acid, methacrylic acid, itaconic acid, maleic anhydride, maleic acid, fumaric acid, and crotonic acid.

[4]
The temperature-responsive hydrogel according to [3], wherein the homopolymer of a carboxyl group-bearing monomer is a polyacrylic acid or a polymethacrylic acid.

[5]
The temperature-responsive hydrogel according to [2] or [3], wherein the monomer constituting the copolymer other than carboxyl group-bearing monomer is at least one selected from the group consisting of acrylate monomers, esters of $\alpha,\beta$-ethylenically unsaturated carboxylic acids, hydroxyalkyl esters of $\alpha,\beta$-ethylenically unsaturated carboxylic acids, alkoxyalkyl esters of $\alpha,\beta$-ethylenically unsaturated carboxylic acids, acrylamide monomers, and styrenic monomers.

[6]
The temperature-responsive hydrogel according to [2], [3], or [5], wherein equal to or more than 50% as a molar ratio of the copolymer is derived from carboxyl group-bearing monomer.

[7]
The temperature-responsive hydrogel according to any of [1] to [6], wherein the polymer includes carboxyl groups in an amount ranging from 0.001 to 0.05 mol/g.

[8]
The temperature-responsive hydrogel according to any of [1] to [7], wherein the carboxyl group-bearing polymer has a crosslinked structure.

[9]
The temperature-responsive hydrogel according to [8], wherein the crosslinked structure is a chemically crosslinked structure and/or a physically crosslinked structure.

[10]
The temperature-responsive hydrogel according to any of [1] to [9], wherein the organic acid is at least one organic acid selected from the group consisting of formic acid, acetic acid, and propionic acid.

[11]
The temperature-responsive hydrogel according to any of [1] to [10], wherein the divalent metal is an alkaline-earth metal.

[12]
The temperature-responsive hydrogel according to any of [1] to [11], wherein the polymer includes the divalent metal salt of an organic acid at a concentration ranging from 50 mM to the saturation concentration.

[13]
The temperature-responsive hydrogel according to any of [1] to [12], wherein the temperature-responsive hydrogel has a lower critical solution temperature (LCST).

[14]
The temperature-responsive hydrogel according to any of [1] to [13], wherein the temperature-responsive hydrogel is transparent at a temperature below the LCST and is in a turbid state at a temperature above the LCST.

[15]

The temperature-responsive hydrogel according to [13] or [14], wherein the LCST falls within a range of 10° C. to 80° C.

[16]

A method for producing a temperature-responsive hydrogel, comprising immersing a carboxyl group-bearing polymer in an aqueous solution of a divalent metal salt of an organic acid.

[17]

The production method according to [16], wherein the aqueous solution of a divalent metal salt of an organic acid contains the divalent metal salt of an organic acid in an amount ranging from 50 mM to the saturation concentration.

Advantageous Effects of Invention

The present invention can provide a temperature-responsive gel that has an LCST without a volume phase transition.

This gel has the following properties.

(1) It is transparent below the LCST; above the LCST phase separation occurs and turbidity appears.

(2) It is flexible below the LCST and above the LCST exhibits a relatively high strength and relatively high toughness. The elastic modulus and toughness exhibit an increasing trend as the temperature increases above the LCST; however, due to a strong phase separation at and above a certain temperature, the elastic modulus may sharply increase (becomes very hard) while the toughness may decline.

(3) The change in volume around the LCST is almost zero and a volume phase transition is not exhibited.

(4) The temperature-responsive phase separation is reversible.

The following properties are exhibited by the gel that has a chemically crosslinked structure (due to a crosslinking agent).

(5) With regard to the temperature responsiveness, for both an increasing temperature and a declining temperature, the response is faster than for a gel having a physically crosslinked structure.

The following properties are exhibited by the gel that has a physically crosslinked structure (not due to a crosslinking agent).

(6) The temperature responsiveness is slower than for the gel having a chemically crosslinked structure. In particular, a trend of slowing with declining temperature occurs.

(7) A high hardness is exhibited above the LCST (a hardness close to that of plastics (for example, acrylic resins) may be exhibited).

(8) Even when cut, regeneration (self-healing) can occur if the cut surfaces are brought into contact.

(9) The shape at a temperature lower than the LCST can also be maintained at temperatures higher than the LCST (shape retention behavior).

(10) Solubility is exhibited under biological conditions (for example, in physiological saline) (biodegradability/bioabsorbability).

BRIEF DESCRIPTION OF DRAWINGS

FIG. 1 gives an outline of a method for producing a chemically crosslinked gel.

FIG. 2 shows, for the chemically crosslinked gel in Example 1, the appearance (transparent and turbid) at a temperature (room temperature) below the LCST and at a temperature (50° C.) above the LCST, and the volume change at room temperature and 50° C.

DESCRIPTION OF EMBODIMENTS

<Temperature-Responsive Gel>

Figure 3A:
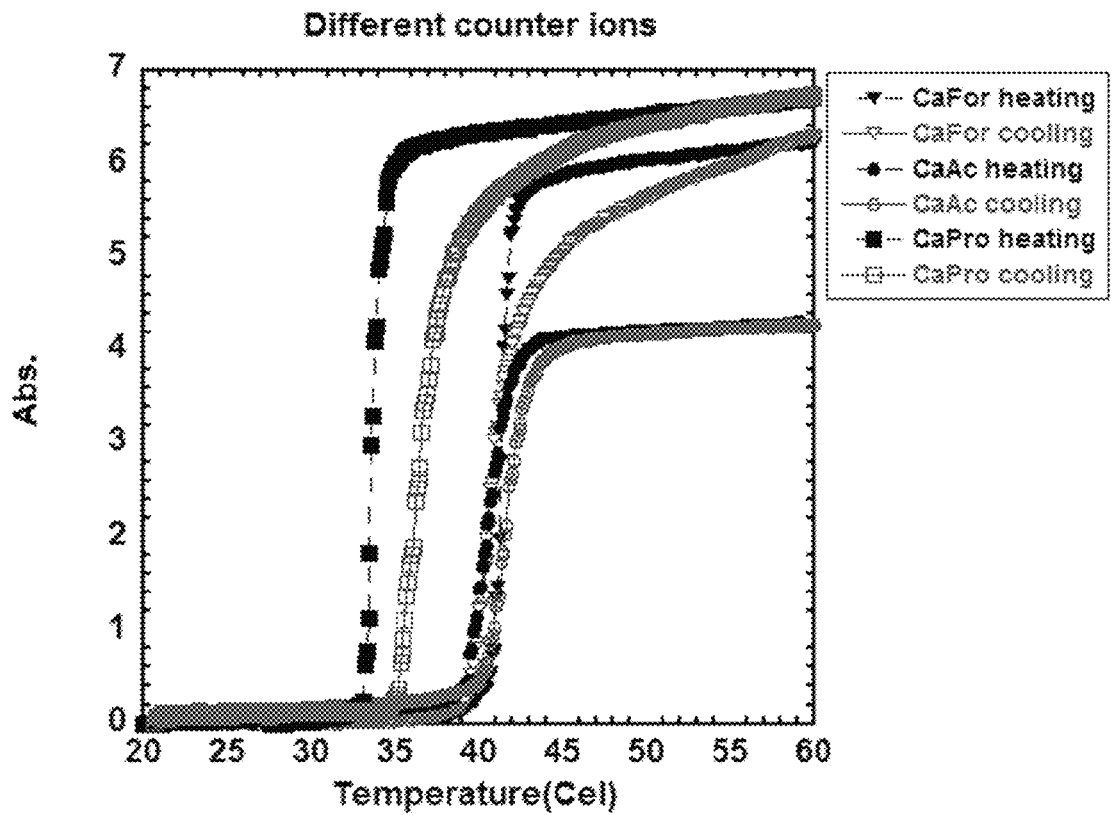
FIG. 3a shows the results of measurement of the LCST for the chemically crosslinked gel of Example 2.

The present invention relates to a temperature-responsive hydrogel that comprises a carboxyl group-bearing polymer and a divalent metal salt of an organic acid.

The carboxyl group-bearing polymer is a carboxyl group-bearing organic polymer compound but is not otherwise particularly limited, and is, for example, a homopolymer of a carboxyl group-bearing monomer or a copolymer of a plurality of monomer species that includes such a monomer.

The carboxyl group-bearing monomer can be exemplified by α,β-unsaturated carboxylic acids that contain one or two or more carboxyl groups in the molecule. Such α,β-unsaturated carboxylic acids can be exemplified by acrylic acid, methacrylic acid, itaconic acid, maleic acid, maleic anhydride, aconitic acid, fumaric acid, and crotonic acid.

The homopolymers of carboxyl group-bearing monomer can be exemplified by polyacrylic acid and polymethacrylic acid. However, this is not intended as a limitation to these homopolymers.

The copolymer can be a copolymer of a plurality of carboxyl group-bearing monomer species or can be a copolymer of carboxyl group-bearing monomer and monomer other than carboxyl group-bearing monomer. There are no particular limitations on the monomer constituting the copolymer other than the carboxyl group-bearing monomer, and the former can be exemplified by at least one selected from the group consisting of acrylate monomers (for example, esters of α,β-ethylenically unsaturated carboxylic acids, hydroxyalkyl esters of α,β-ethylenically unsaturated carboxylic acids, and alkoxyalkyl esters of α,β-ethylenically unsaturated carboxylic acids), acrylamide monomers, and styrenic monomers.

The aforementioned acrylate monomers are not particularly limited and can be exemplified by esters of α,β-ethylenically unsaturated carboxylic acids, e.g., methyl acrylate, methyl methacrylate, ethyl acrylate, ethyl methacrylate, n-propyl acrylate, n-propyl methacrylate, isopropyl acrylate, isopropyl methacrylate, lauryl acrylate, and stearyl acrylate; hydroxyalkyl esters of α,β-ethylenically unsaturated carboxylic acids, e.g., 2-hydroxyethyl acrylate, 2-hydroxyethyl methacrylate, and 3-hydroxypropyl methacrylate; and alkoxyalkyl esters of α,β-ethylenically unsaturated carboxylic acids, e.g., diethylene glycol methacrylate.

The aforementioned acrylamide monomers are not particularly limited and can be exemplified by acrylamide and methylolmethacrylamide.

The aforementioned styrenic monomer is not particularly limited and can be exemplified by styrene and alkylstyrenes.

In the case of a copolymer, preferably equal to or more than 50% as a molar ratio is derived from carboxyl group-bearing monomer from the standpoint of exhibiting the temperature responsiveness that is a characteristic of the hydrogel according to the present invention. A copolymer for which preferably equal to or more than 60%, more preferably equal to or more than 70%, still more preferably equal to or more than 80%, and most preferably equal to or more than 90%, as a molar ratio, is derived from carboxyl group-bearing monomer is advantageous.

From the standpoint of exhibiting the temperature responsiveness that is a characteristic of the hydrogel according to the present invention, the carboxyl group content in the polymer is, for example, suitably in the range from 0.001 to 0.05 mol/g and is preferably in the range from 0.005 to 0.03 mol/g and more preferably in the range from 0.007 to 0.014 mol/g.

The carboxyl group-bearing polymer can have a crosslinked structure, and the crosslinked structure can be a chemically crosslinked structure or a physically crosslinked structure. The chemically crosslinked structure can be formed by crosslinking with a crosslinking agent during polymer formation or after polymer formation.

A di-functional or more multi-functional monomer can be used as the crosslinking agent used to form a chemically crosslinked structure. This crosslinking agent can be exemplified by N,N'-methylenebisacrylamide (MbAAd), N,N'-ethylenebisacrylamide, diethylene glycol diacrylate, diethylene glycol dimethacrylate, polyethylene glycol diacrylate, polyethylene glycol dimethacrylate, and 1-acryloyloxy-3-methacryloyloxy-2-propanol. The amount of the crosslinking agent can be in the range, for example, from 0 to 10 mol % with reference to the monomer concentration in conformity with the desired degree of crosslinking.

The mass-average molecular weight of the polymer is not particularly limited, but may be, for example, equal to or less than 1,000,000 and is more preferably equal to or less than 500,000. The lower limit may be, for example, equal to or more than 5,000 and is preferably equal to or more than 10,000. However, it may not actually be possible to measure the average molecular weight of the polymer having a crosslinked structure.

The physically crosslinked structure is formed by the formation of a salt between two carboxyl groups possessed by the polymer and one divalent metal and/or by polymer entanglement. The former physically crosslinked structure is formed by the formation of a salt by the divalent metal in polymer that has been formed without using a crosslinking agent. A phenomenon wherein the physically cut hydrogel undergoes re-unification after cutting is due mainly to salt formation between the carboxyl groups and divalent metal. However, it is hypothesized that polymer entanglement also proceeds with the passage of a relatively long period of time and further strengthens the re-unification due to salt formation. The hydrogel according to the present invention having a chemical crosslinked structure may also have a physically crosslinked structure due to salt formation between one divalent metal and two carboxyl groups possessed by the polymer and also due to the presence of polymer entanglement.

The polymerization method used to prepare the polymer is exemplified by radical polymerization using a thermal initiator (thermal polymerization) and by photopolymerization using a photoinitiator. Photopolymerization is preferred. Known initiators may be used as appropriate as the polymerization initiator. The photoinitiator can be, for example, α-ketoglutaric acid. The initiator can be, for example, in the range from 0.01 to 10 mol % with reference to the monomer concentration.

The organic acid constituting the divalent metal salt of an organic acid is not particularly limited, but can be exemplified by fatty acids (fatty carboxylic acids), aromatic carboxylic acids, oxocarboxylic acids, and other organic acids.

The fatty acids (fatty carboxylic acids) can be exemplified by the following compounds.

formic acid [methanoic acid]
acetic acid [ethanoic acid]
propionic acid [propanoic acid]
butyric acid [butanoic acid]
isobutyric acid
valeric acid [pentanoic acid]
isovaleric acid
caproic acid [hexanoic acid]
enanthic acid (heptylic acid) [heptanoic acid]
caprylic acid [octanoic acid]
pelargonic acid [nonanoic acid]
capric acid [decanoic acid]
lauric acid [dodecanoic acid]
myristic acid [tetradecanoic acid]
pentadecylic acid [pentadecanoic acid]
palmitic acid (cetanoic acid) [hexadecanoic acid]
margarinic acid [heptadecanoic acid]
stearic acid [octadecanoic acid]
oleic acid
linoleic acid
linolenic acid
tuberculostearic acid [nonadecanoic acid]
arachidic acid [eicosanoic acid]
arachidonic acid
eicosapentaenoic acid
behenic acid [docosanoic acid]
docosahexaenoic acid
lignoceric acid [tetracosanoic acid]
cerotic acid [hexacosanoic acid]
montanic acid [octacosanoic acid]
melissic acid [triacontanoic acid]

The aromatic carboxylic acids can be exemplified by the following compounds.
salicylic acid [hydroxybenzoic acid]
gallic acid (trihydroxybenzoic acid)
benzoic acid [benzenecarboxylic acid]
phthalic acid
cinnamic acid (β-phenylacrylic acid)
mellitic acid (graphitic acid) [benzenehexacarboxylic acid]

The oxocarboxylic acids can be exemplified by the following compound.
pyruvic acid (oxopropionic acid, α-ketopropionic acid, pyroracemic acid)

The other organic acids can be exemplified by the following compounds.
oxalic acid [ethanedioic acid]
lactic acid (α-hydroxypropanoic acid)
tartaric acid
maleic acid
fumaric acid (allomaleic acid, boletic acid, lichenic acid)
malonic acid [propanedioic acid]
succinic acid
malic acid (hydroxysuccinic acid)
citric acid
aconitic acid
glutaric acid
adipic acid [hexanedioic acid]
amino acids
L-ascorbic acid (vitamin C)

The organic acid is preferably, for example, formic acid, acetic acid, or propionic acid based on a consideration of the solubility curve and solubility in aqueous solution of the salt in the hydrogel. For example, in the range from 0° C. to 100° C., calcium formate exhibits for its relationship with temperature a relatively modestly positive solubility curve (the solubility rises when the temperature rises). In contrast to this, for its relationship with temperature, calcium acetate exhibits a negative solubility curve in the range from 0° C. to approximately 60° C. and exhibits a relatively modestly positive solubility curve in the range from approximately 50° C. to approximately 85° C. For its relationship with temperature, calcium propionate exhibits a negative solubility curve in the range from 0° C. to approximately 50° C. and a positive solubility curve in the range from approximately 50° C. to 100° C.

The divalent metal constituting the divalent metal salt of an organic acid is not particularly limited and can be, for example, an alkaline-earth metal. The alkaline-earth metals can be exemplified by calcium (Ca), magnesium (Mg), strontium (Sr), and barium (Ba).

The divalent metal salt of an organic acid is preferably, for example, Ca formate, Ca acetate, Ca propionate, Mg formate, Mg acetate, or Mg propionate. The LCST of the hydrogel can be varied through the type of a divalent metal salt of an organic acid used.

The concentration of the divalent metal salt of an organic acid in the polymer can be established as appropriate considering the properties required of the temperature-responsive hydrogel according to the present invention and the amount of carboxyl group in the polymer. The concentration of an aqueous solution of the divalent metal salt of an organic acid impregnated in the polymer can be, for example, in the range from 50 mM to the saturation concentration, and is preferably in the range from 50 mM to 500 mM. The saturation concentration denotes the saturation amount (equal equivalents) with respect to the amount of carboxyl group in the polymer. The LCST of the hydrogel can be varied using the concentration of the divalent metal salt of an organic acid contained in the polymer. The concentration of the divalent metal in the polymer tends to be higher than the divalent metal concentration in the aqueous solution of divalent metal salt of an organic acid that is impregnated in the polymer, and varies with conditions such as the carboxyl group concentration in the polymer, the concentration of the divalent metal salt of an organic acid in the aqueous solution, and so forth, and may be, for example, a concentration that is approximately 1.1- to 2.0-times and more typically approximately 1.2- to 1.5-times higher. When the divalent metal is calcium, the divalent metal concentration in the polymer is, for example, in the range from approximately 1 mg to 100 mg in 1 g of polymer (gel), and more typically can be in the range from 10 mg to 70 mg and even more typically can be in the range from approximately 15 mg to 50 mg.

The total metal ion concentration in the polymer can be measured, for example, using inductively coupled plasma atomic emission analysis (ICP). A known volume of the polymer is incinerated (for example, at approximately 1000° C.) to remove the organic component; the residue is dissolved in a known volume of water; and the metal ion concentration can be determined by submitting this aqueous solution to measurement by ICP. The concentration in the polymer of free metal ion, which does not participate in formation of the organic acid salt, can be measured, for example, using a metal ion electrode. When metal ion forming the organic acid salt and free metal ion are present in the polymer, the two can be discriminated using this method.

The present invention relates to a hydrogel, wherein a hydrogel is a gel for which the main constituent components are a polymer and water or an aqueous solution. Whether or not the polymer forms a hydrogel can be determined mainly by the length of the polymer (in other words, the concentration of the polymerization initiator). For the same polymer mass, the tendency to undergo gelation increases at a higher polymerization initiator concentration. From this standpoint, for the case, for example, of acrylic acid as the monomer, gelation tends to occur at equal to or higher than 3 M when the polymerization initiator concentration is 0.1 mol % and at equal to or higher than 2 M when the polymerization initiator concentration is 0.01 mol %. This is about the same when the monomer is methacrylic acid. The polymerization initiator concentration can be suitably selected in the hydrogel formation range, in conformity with the type of polymerization initiator and the type of monomer.

The temperature-responsive hydrogel according to the present invention has a lower critical solution temperature (LCST). The LCST is the lower critical solution temperature where the hydrogel develops turbidity due to phase separation, and is an indicator of the phase separation temperature. The presence of an LCST can be evaluated, for example, by measurement of the turbidity (transmittance) using an ultraviolet-visible-near infrared spectrophotometer. This evaluation can also be performed by endo-/exothermic peak measurement by differential scanning calorimetry. This evaluation can also be performed by measurement of the temperature dependence of the dynamic elastic modulus using a rheometer (viscoelastic measurement instrument). The LCST of the temperature-responsive hydrogel according to the present invention, while varying with the composition of the polymer and the type and concentration of the divalent metal salt of an organic acid, is, for example, in the range from 10° C. to 80° C. and is preferably in the range from 25° C. to 45° C.

The temperature-responsive hydrogel according to the present invention is transparent at a temperature below the LCST and is in a turbid state at a temperature above the LCST. In the present invention, transparent denotes a transmittance at a wavelength of 550 nm of equal to or more than 85%, while a turbid state denotes a transmittance at a wavelength of 550 nm of equal to or less than 30%.

<Production Method>

The present invention encompasses a method for producing a temperature-responsive hydrogel, wherein the method includes immersing a carboxyl group-bearing polymer in an aqueous solution of a divalent metal salt of an organic acid.

The carboxyl group-bearing polymer and the divalent metal salt of an organic acid are the same as described above with reference to the temperature-responsive hydrogel according to the present invention. Immersion of the polymer in the aqueous solution of divalent metal salt of an organic acid can be performed at normal temperatures, for example, at a temperature in the range from 4° C. to 30° C. However, it can be performed at a temperature higher than or at a temperature lower than the LCST in terms of the LCST of the obtained temperature-responsive hydrogel.

The concentration of the divalent metal salt of an organic acid in the aqueous solution of the divalent metal salt of an organic acid may be determined as appropriate considering the type of polymer, type of divalent metal salt of an organic acid, and desired LCST, and, for example, may be in the range of 50 mM to the saturation concentration. For example, the temperature-responsive hydrogel according to the present invention can be obtained by immersion, until an approximate equilibrium is reached, in an aqueous solution containing a divalent metal of an organic acid salt at from 50 mM to the saturation concentration. With regard to the immersion time, in the case of a chemically crosslinked gel, for example, an approximate equilibrium is reached at about 1 to 72 hours, and in the case of a physically crosslinked gel an approximate equilibrium is reached in 2 to 7 days. However, immersion until reaching equilibrium may also be unnecessary as long as the desired properties are obtained.

A temperature-responsive hydrogel according to the present invention as described above can be produced by the production method according to the present invention.

<Applications of Temperature-Responsive Hydrogel>

The temperature-responsive hydrogel according to the present invention has the following properties.

(1) It is transparent below the LCST; above the LCST phase separation occurs and turbidity appears (for example, refer to the results of Example 1 (FIG. 2) and Example 2 (FIG. 3a)).

(2) It is flexible below the LCST and above the LCST exhibits a high strength and high toughness. The elastic modulus and toughness increase as the temperature increases above the LCST; however, due to a strong phase separation at and above a certain temperature, the elastic modulus sharply increases (becomes very hard) while the toughness declines (for example, refer to the results of Example 7 (FIG. 10)).

(3) The change in volume around the LCST is almost zero (for example, refer to the results of Example 1 (FIG. 2), Example 2 (FIG. 4), and Example 8 (FIG. 13)) and a volume phase transition is not exhibited. For the hydrogel according to the present invention, the idea that a volume phase transition is not exhibited, or that a volume phase transition is substantially not exhibited, means that $V_2/V_1$, i.e., the ratio of the volume $V_2$ at a temperature above the LCST (for example, $T_2 \geq LCST+5°$ C.) to the volume $V_1$ at a temperature below the LCST (for example, $T_1 \leq LCST-5°$ C.), is in the range from 0.8 to 1.2, preferably in the range from 0.85 to 1.15, and more preferably in the range from 0.98 to 1.02.

(4) The temperature-responsive phase separation is completely reversible (refer, for example, to the results of Example 1 (FIG. 2) and Example 2 (FIG. 4)).

The following properties are exhibited by the gel that has a chemically crosslinked structure (due to a crosslinking agent).

(5) With regard to the temperature responsiveness, the response is fast at both an increasing temperature and a declining temperature.

The following properties are exhibited by the gel that has a physically crosslinked structure (not due to a crosslinking agent).

Figure 12:
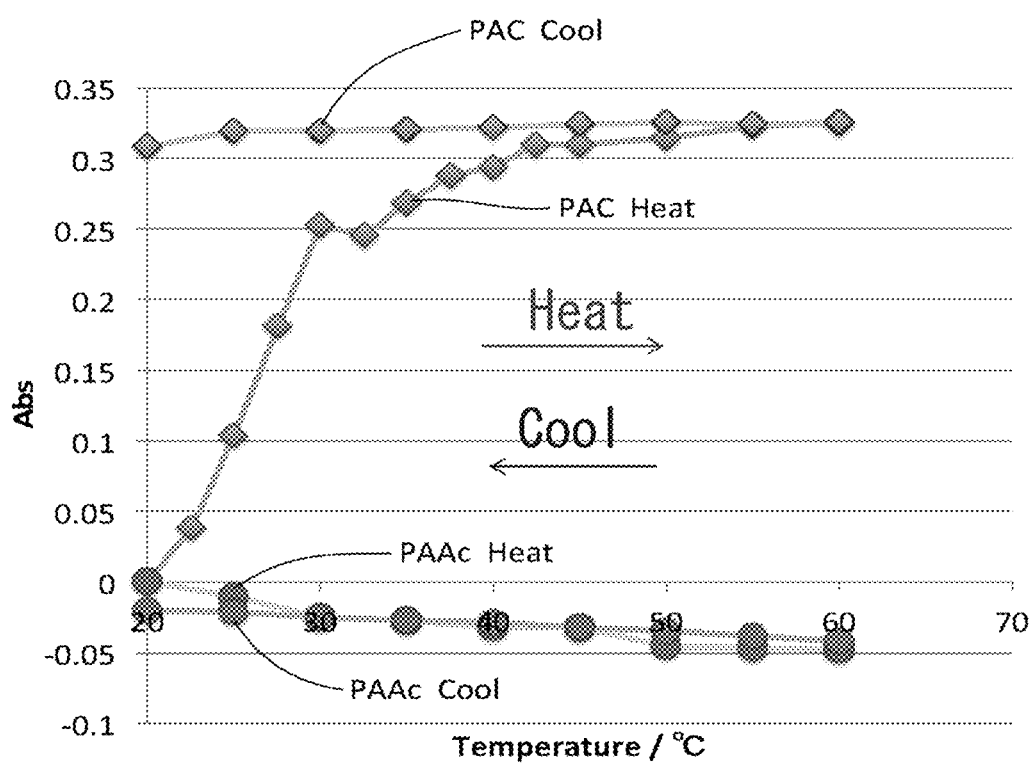
FIG. 12 shows the results of measurement of the LCST for the physically crosslinked gel of Example 8.

(6) The temperature responsiveness is slow and is particularly slow with declining temperature (for example, refer to the results of Example 8 (FIG. 12)).

Figure 28:
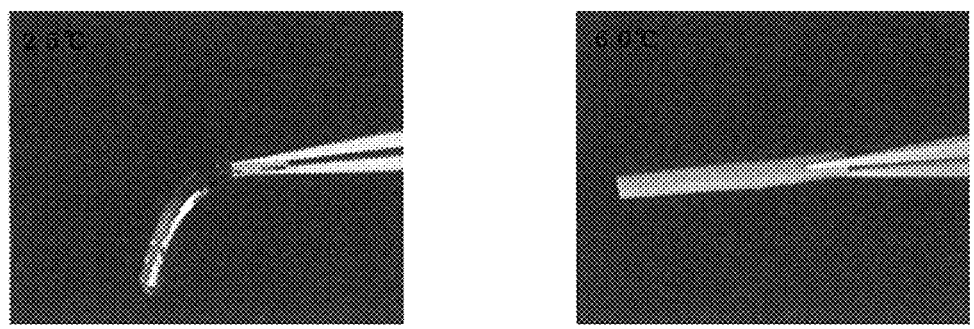
FIG. 28 provides photographs of a test specimen, at 25° C. and 60° C., of the chemically crosslinked hydrogel (LCST=33.5° C.) tested in Example 7.

(7) A high hardness is exhibited above the LCST, for example, a hardness close to that of plastics such as acrylic resins is exhibited (for example, refer to the results of Example 7 (FIG. 28)).

(8) Even when cut, if the cut surfaces are brought into contact, the cut surfaces rejoin and regeneration (self-healing) occurs (for example, refer to the results of Example 8 (FIG. 15)).

(9) A lower-temperature shape can be maintained at higher temperatures (shape retention behavior) (for example, refer to the results of Example 8 (FIG. 13)).

(10) Solubility is exhibited under biological conditions (for example, in physiological saline) (biodegradability/bioabsorbability) (for example, refer to the results of Example (FIG. 29)).

The density of the hydrogel according to the present invention can be controlled and varied through the charge concentration of the monomer and the use/nonuse of a crosslinking agent. For example, in the case of a hydrogel with a physically crosslinked structure obtained without the use of a crosslinking agent, and for acrylic acid as the monomer, the density of the hydrogel obtained at an acrylic acid monomer charge concentration of 3 M is approximately 0.22 g/cm$^3$ (molecular weight of AAc=72.06, 3 M=216.18 g/1000 mL≈0.22 g/cm$^3$).

The temperature-responsive hydrogel according to the present invention exhibits the properties Indicated above and can be deployed in a variety of applications. For example, it can be used as a temperature-responsive structural material, as a temperature-responsive scaffolding material for cell culture, and as a temperature-responsive porous material, in each case for which the dimensions thereof do not change with temperature. However, there is no limitation to the preceding.

EXAMPLES

The present invention is more particularly described in the following based on examples. However, the examples are illustrations of the present invention, and there is no intent for the present invention to be limited to or by the examples.

Production Method

A diagram that outlines a method for producing the temperature-responsive hydrogel according to the present invention is given in FIG. 1. A precursor aqueous solution is prepared by dissolving the following in ultrapure water: carboxyl group-bearing monomer (typically acrylic acid (AAc) or methacrylic acid (MAAc)) in the range from 1 to 6 M, the initiator α-ketoglutaric acid in the range from 0.01 to 10 mol % with reference to the monomer concentration, and the crosslinking agent N,N'-methylenebisacrylamide (MbAAd) in the range from 0 to 10 mol % with reference to the monomer concentration. Here, a physically crosslinked gel is obtained at a crosslinking agent concentration of 0 mol %, while a chemically crosslinked gel is obtained when the crosslinking agent is added.

This solution is poured into a form with a freely selected shape, and a gel is formed by polymerizing for equal to or more than 8 hours under exposure to ultraviolet radiation at a wavelength of 365 nm in an argon gas atmosphere. A sample is obtained by immersing, until equilibrium Is reached, the polymerized gel or nonflowable high-viscosity material in a sufficient amount of an aqueous solution which is prepared by dissolving a salt formed of a carboxylic acid and a divalent cation (typically calcium acetate) in ultrapure water at a concentration in a range from 50 mM to the saturation concentration.

Abbreviations
AAc: acrylic acid
MAAc: methacrylic acid
AMPS: 2-acrylamide-2-methylpropanesulfonic acid
AAm: acrylamide
MbAAd: N,N'-methylenebisacrylamide
CaAc: calcium acetate Measurement Methods Volume measurement: before and after phase transition, the thickness and diameter are measured three times on the gel molded on a disk, and the average thereof and deviation are calculated.

Measurement of the LCST Temperature: this was determined from the turbidity using an ultraviolet-visible-infrared spectrophotometer. The sample and soaking salt solution were introduced into a quartz cell and the absorbance was measured at a fixed wavelength of 500 nm while raising the temperature/lowering the temperature at a constant heating/cooling rate (0.1 C/min) in the range from 20° C. to 60° C.

Observation of Constant Volume Phase Transition Structure

Two samples, i.e., before phase transition and after phase transition, were quickly sandwiched with copper blocks that had been thoroughly cooled in advance with liquid nitrogen (−196° C.) and the structure was frozen by rapid freezing; this was followed by drying of the gel by freeze drying. Using a scanning electron microscope, observation was carried out on the cross section exposed by cutting the dried sample.

Mechanical Testing

Using a tensile tester, tensile testing was performed in the salt solution soaking the test specimen, which had been molded in a dumbbell shape. The temperature of the salt solution was adjusted using a water bath. After holding long enough to make the temperature uniform, pulling was carried out at a speed in the range from 1 to 1000 mm/min and the stress-strain curve was obtained from the initial dimensions of the sample. The Young's modulus was determined from the initial slope; the fracture stress and fracture strain were determined when fracture occurred; and the toughness was determined from the area of the stress-strain curve.

Evaluation of self-healing: after the aforementioned mechanical testing had been performed, the tensile test was run a second time on the same sample after the sample had been submitted to different waiting times. The percentage between the area of the obtained stress-strain curve and the area for the first time was determined to give the recovery percentage.

Metal Concentration in Hydrogel

The volume and mass of a hydrogel sample were measured, following by incineration of the hydrogel sample at approximately 1000° C. to remove the organic component. The residue was dissolved in a known amount of water, and the total metal ion concentration in the polymer was measured by inductively coupled plasma atomic emission analysis (ICP) using the resulting aqueous solution. The metal ion concentration in the hydrogel sample was calculated from the measurement results (for example, number of moles or mass of metal ion in 1 g).

Experimental Results

Example 1

The example of a chemically crosslinked hydrogel is given.

Polymer: 3 M AAc—0.1 mol % α-ketoglutaric acid (concentration with respect to monomer concentration, actual: 3 M×0.1/100=3 mM)–0.5 mol % MbAAd (ditto, actual: 15 mM), amount of carboxyl group=100%, molecular weight: substantially infinite (not measurable, same applies to the chemically crosslinked hydrogels in the following).

Organic acid salt: 100 mM calcium acetate (CaAc)

FIG. 2 shows the appearance (transparent and turbid) at a temperature (room temperature) below the LCST and at a temperature (50° C.) above the LCST, and the volume change for room temperature and 50° C. It is demonstrated that the volume change is almost nonexistent and is constant.

Example 2 (Influence of Organic Acid)

Figure 3B:
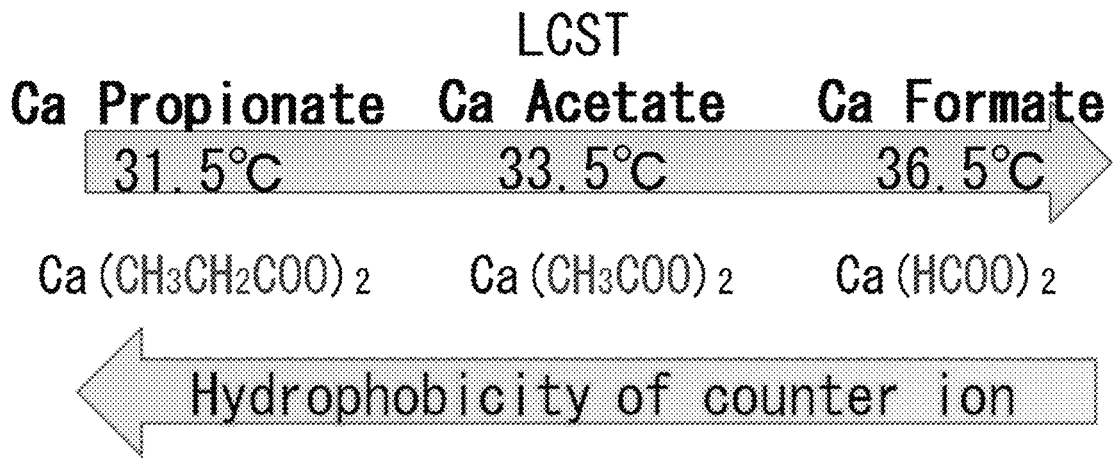
FIG. 3b shows the LCST for different systems (Ca propionate, Ca acetate, Ca formate) for the chemically crosslinked gel of Example 2.

The example of a chemically crosslinked hydrogel is given.
Polymer: 3 M AAc-0.1 mol % α-ketoglutaric acid-0.5 mol % MbAAd, amount of carboxyl group=100%, molecular weight: substantially infinite Organic acid salt: Ca propionate, Ca acetate (CaAc), Ca formate, each at 100 mM The results of measurement of the LCST are shown in FIG. 3a. The LCST for each system is shown in FIG. 3b. The LCST is shown to change due to a change in the organic acid in the organic acid salt.

Figure 4:
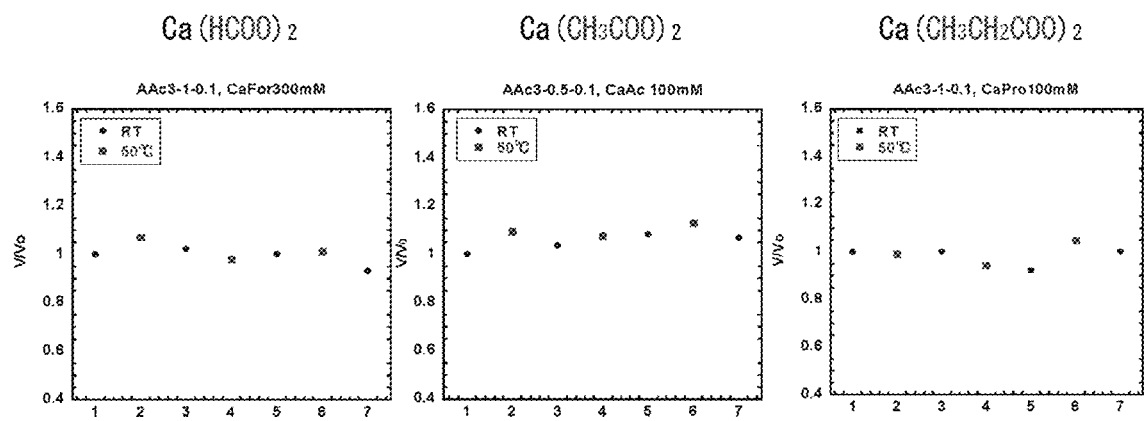
FIG. 4 shows, for the chemically crosslinked gel of Example 2, the change in volume at room temperature and 50° C. for different ionic species.

FIG. 4 shows the change in volume with ionic species at room temperature and 50° C. It is shown that the volume substantially does not change regardless of the ionic species.

Figure 5:
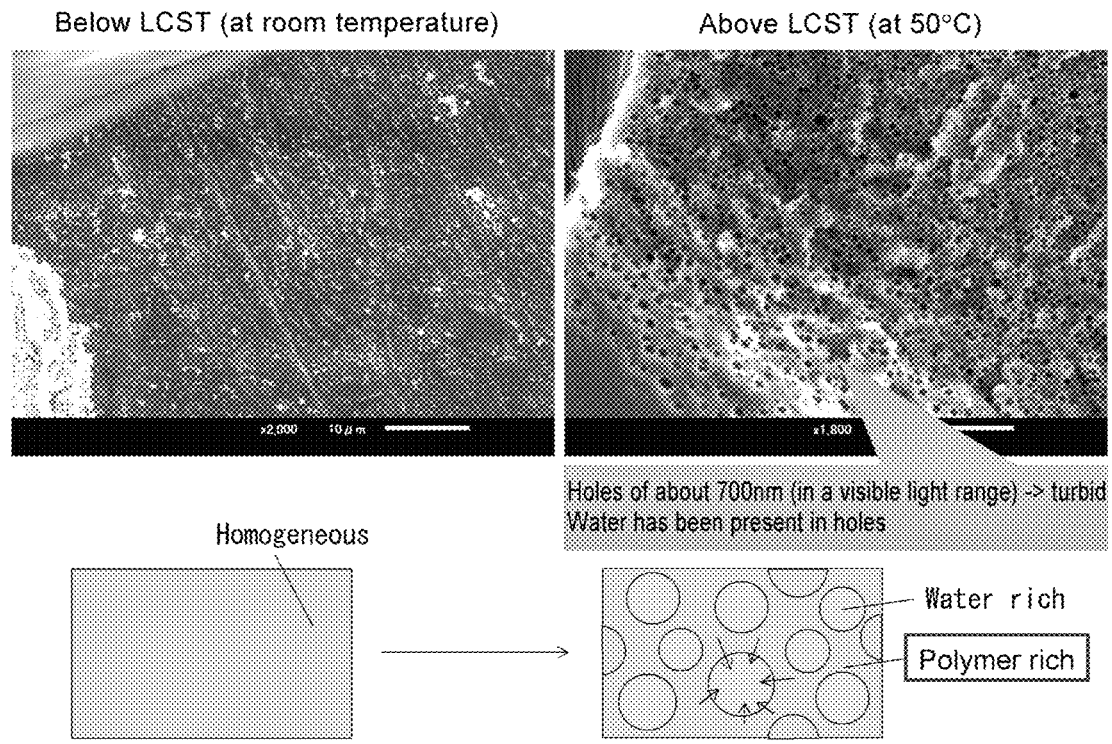
FIG. 5 provides photographs, for the chemically crosslinked gel of Example 2, of the surface state of the gel at room temperature and 50° C.

FIG. 5 gives photographs of the surface state of the gel at room temperature and 50° C. The structural principle (reason) is demonstrated whereby the hydrogel according to the present invention has a constant volume with respect to temperature changes.

Example 3 (Influence of Metal, Influence of Counteranion)

Figure 6:
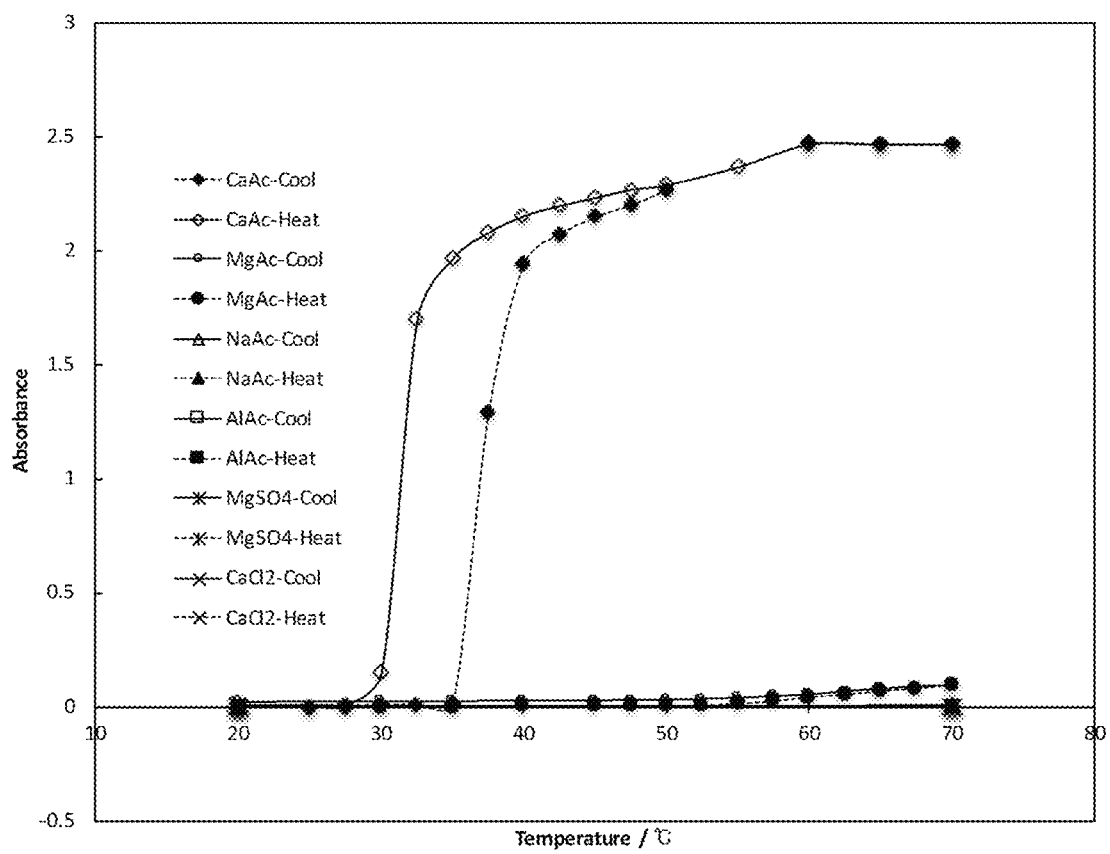
FIG. 6 shows the influence of the salt species and the counteranion for the chemically crosslinked gel of Example 3.

The example of a chemically crosslinked hydrogel is given.
Polymer: AAc 3 M-0.1 mol % α-ketoglutaric acid-0.5 mol % MbAAd, amount of carboxyl group=100%, molecular weight: substantially infinite
Organic acid salt: CaAc, MgAc, NaAc, AlAc, $CaCl_2$, $MgSO_4$, each at 100 mM The results are given in FIG. 6. An LCST was exhibited for the two cases of calcium acetate and magnesium acetate (the effect for magnesium acetate was smaller than for calcium acetate). An LCST was not exhibited by the chloride salt or sulfate salt. Based on these results, it is shown that, in order to obtain a hydrogel that exhibits an LCST, the metal must be a divalent metal (cation) and a combination with an organic acid (preferably acetic acid) ion is required for the counteranion.

Example 4 (Influence of Polymer)

Figure 7:
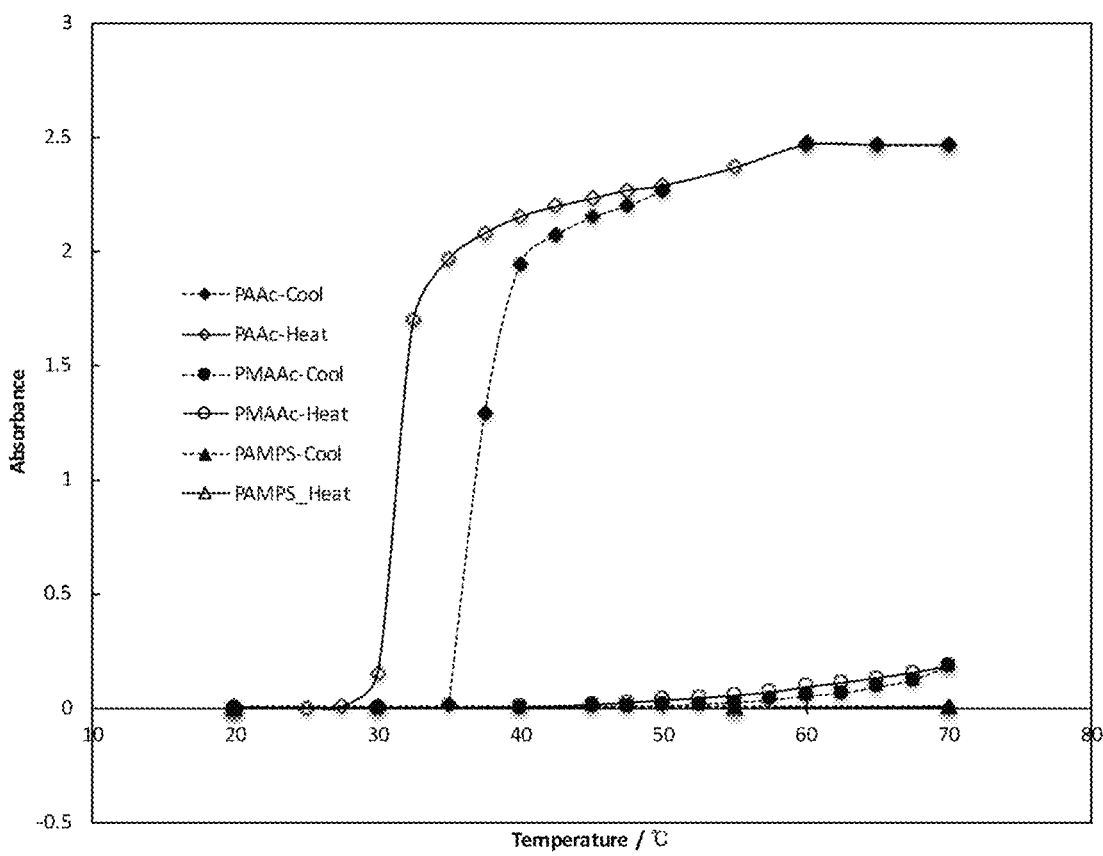
FIG. 7 shows the influence of the polymer species for the chemically crosslinked gel of Example 4.

The example of a chemically crosslinked hydrogel is given.
Polymer:
(1) 3 M AAc-0.1 mol % α-ketoglutaric acid-0.5 mol % MbAAd, amount of carboxyl group=100%, molecular weight: substantially infinite
(2) 3 M MAAc-0.1 mol % α-ketoglutaric acid-0.5 mol % MbAAd, amount of carboxyl group=100%, molecular weight: substantially infinite
(3) 3 M AMPS-0.1 mol % α-ketoglutaric acid-0.5 mol % MbAAd, amount of carboxyl group=0%, molecular weight: substantially infinite
AMPS: 2.-acrylamido-2-methylpropanesulfonic acid, amount of carboxyl group=0%, molecular weight: substantially infinite
Organic acid salt: CaAc, each at 100 mM The results are given in FIG. 7. An LCST was exhibited with polyacrylic acid and polymethacrylic acid. An LCST was not exhibited, on the other hand, by PAMPS. These results demonstrate that a carboxyl group-bearing polymer Is required for the exhibition of an LCST.

Example 5 (Influence of Salt Concentration)

Figure 8A:
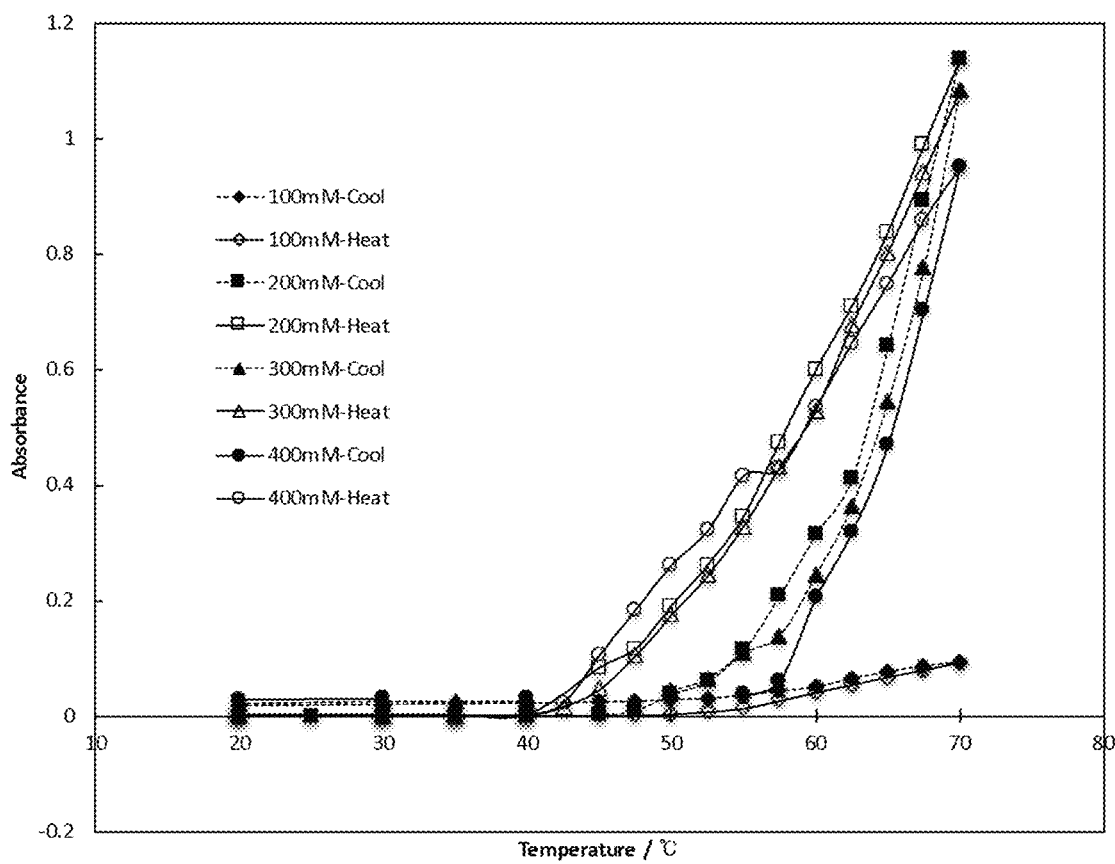
FIG. 8a shows the effect of the salt concentration for the chemically crosslinked gel (PAAc-MgAc) of Example 5.
Figure 8B:
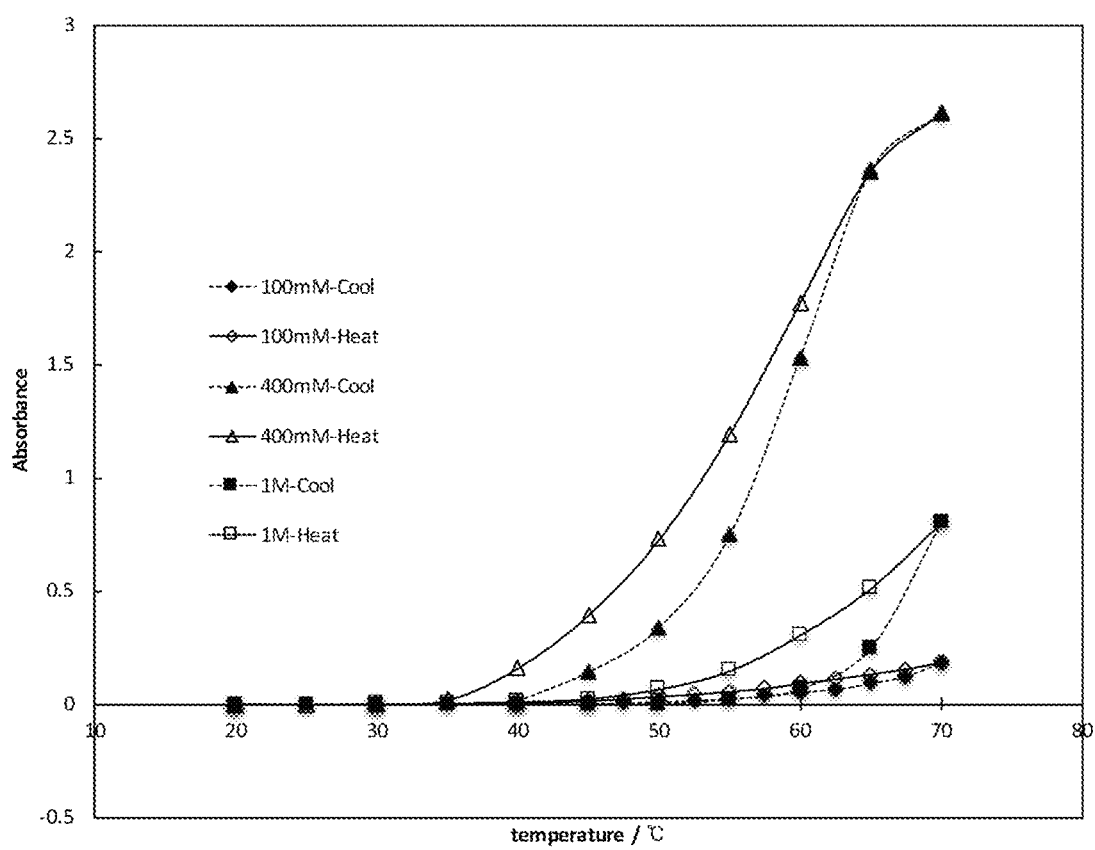
FIG. 8b shows the effect of the salt concentration for the chemically crosslinked gel (PMAAc-CaAc) of Example 5.

The example of a chemically crosslinked hydrogel is given.
Polymer:
(1) 3 M AAc-0.1 mol % α-ketoglutaric acid-0.5 mol % MbAAd, amount of carboxyl group=100%, molecular weight: substantially infinite
(2) 3 M MAAc-0.1 mol % α-ketoglutaric acid-0.5 mol % MbAAd, amount of carboxyl group=100%, molecular weight: substantially infinite
Organic acid salt: CaAc, MgAc The results are given in FIG. 8a and FIG. 8b. The LCST is shown to have a minimum value depending on the salt concentration. For PAAc-MgAc in FIG. 8a and PMAAc-CaAc in FIG. 8b, it is shown that the LCST declines when the salt concentration is raised, while at higher concentrations the LCST increases.

Example 6 (Influence of Copolymer)

The example of a chemically crosslinked (without MbAAd) hydrogel is given.
Polymer:
(1) 4.17 M AAc-0.83 M AAm (total of 5 M) 0.5 M-0.1 mol % α-ketoglutaric acid (actual 5 mM), amount of carboxyl group=83.3%
(2) 3.33 M AAc-1.67 M AAm (total of 5 M) 1 M-0.1 mol % α-ketoglutaric acid (actual 5 mM), amount of carboxyl group=66.7%
(3) 2.5 M AAc-2.5 M AAm-0.1 mol % α-ketoglutaric acid (actual 5 mM), amount of carboxyl group=50%
(4) 1.67 M AAc-3.33 M AAm-0.1 mol % α-ketoglutaric acid (actual 5 mM), amount of carboxyl group=33.3%
(5) 0.83 M AAc-4.17 M AAm-1 mol % α-ketoglutaric acid (actual 5 mM), amount of carboxyl group=16.7%
Organic acid salt: 400 mM CaAc (Ca concentration in mM in gel)

Figure 9:
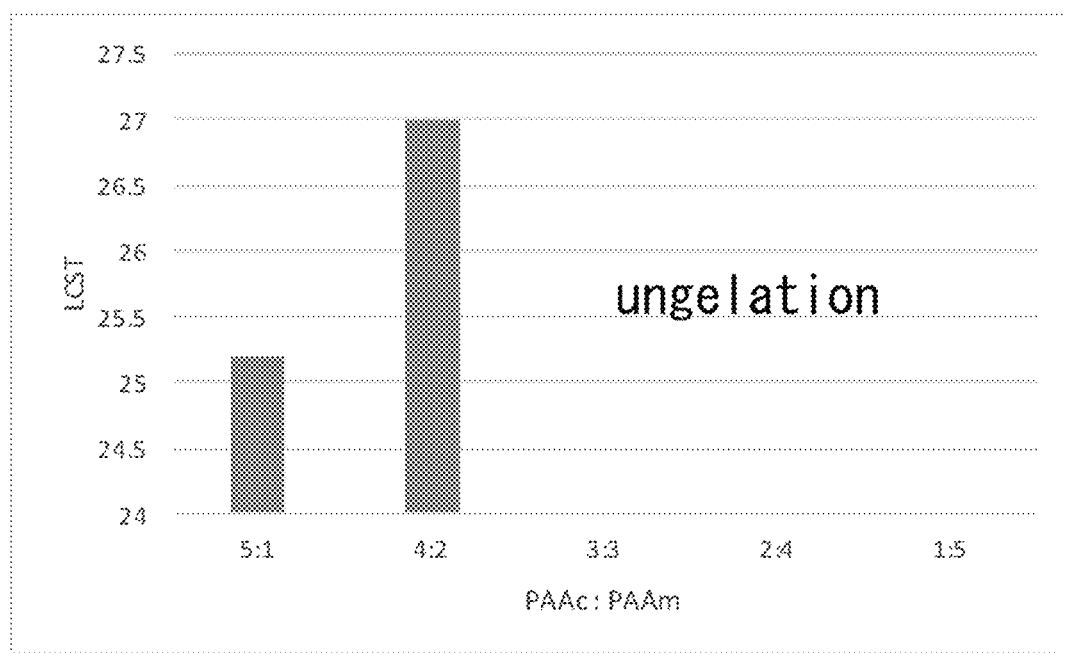
FIG. 9 shows the effect for the copolymer (content of PAAc and LCST) for the chemically crosslinked gel of Example 6.

The LCST was measured at different copolymerization ratios between AAc, which exhibits an LCST, and acrylamide (AAm), which does not exhibit an LCST. The results are given in FIG. 9. At higher AAc concentrations, the LCST is lower and a phase separation structure is more readily produced. It is shown that gelation does not occur when the AAm concentration exceeds 50%.

Example 7 (Tensile Mechanical Testing)

Figure 10:
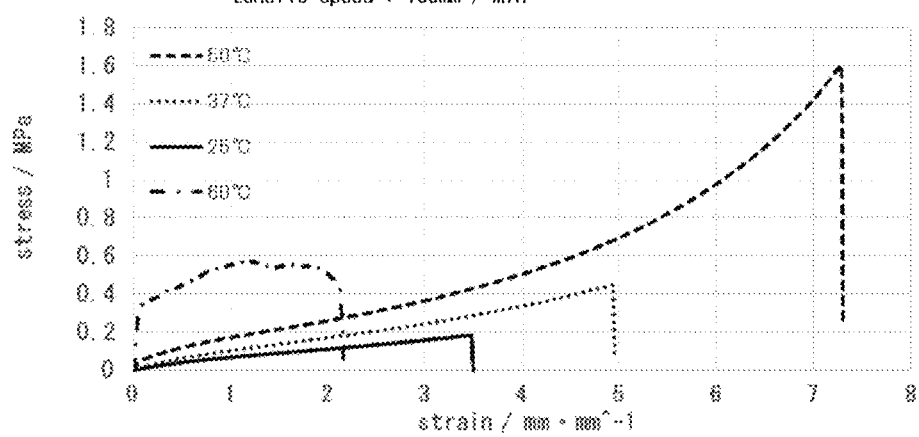
FIG. 10 shows the results of tensile mechanical testing for the chemically crosslinked gel of Example 7.
Figure 11:
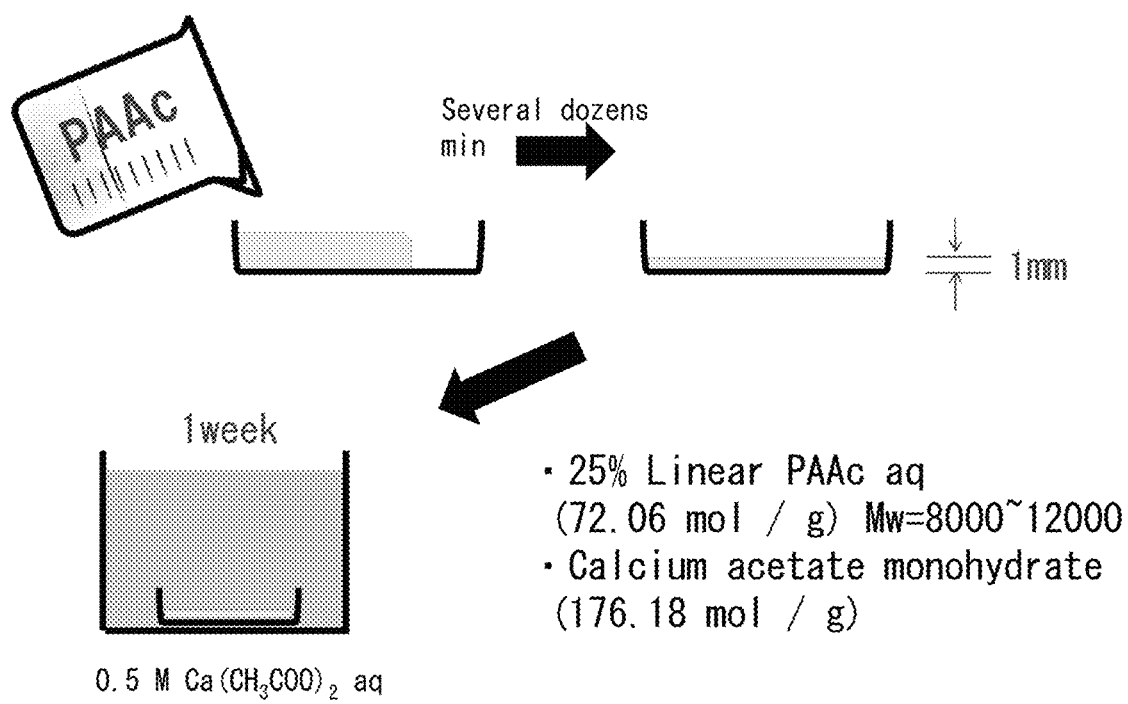
FIG. 11 gives an outline of a method for producing a physically crosslinked gel.

The example of a chemically crosslinked hydrogel (LCST=33.5° C.) is given. FIG. 10 gives the results of tensile mechanical testing for measurement temperatures of 25° C., 37° C., 50° C., and 60° C. At 50° C., which is equal to or above the LCST, a high strength and high toughness are obtained and the elastic modulus and toughness both increase with an increase in temperature. At a higher temperature of 60° C., it Is shown that the elastic modulus is sharply higher (becomes very hard) and the toughness is reduced. Photographs of the test specimen at 25° C. and 60° C. are given in FIG. 28.

Example 8

The example of a physically crosslinked hydrogel is given.
Polymer: 25% straight-chain PAAc aqueous solution (72.06 mol/g)
Mw=8,000 to 12,000
Organic acid salt: 176.18 mol/g CaAc The results of measurement of the LCST are given in FIG. 12. (During cooling, complete recovery was eventually obtained, but very slowly.)

Figure 13:
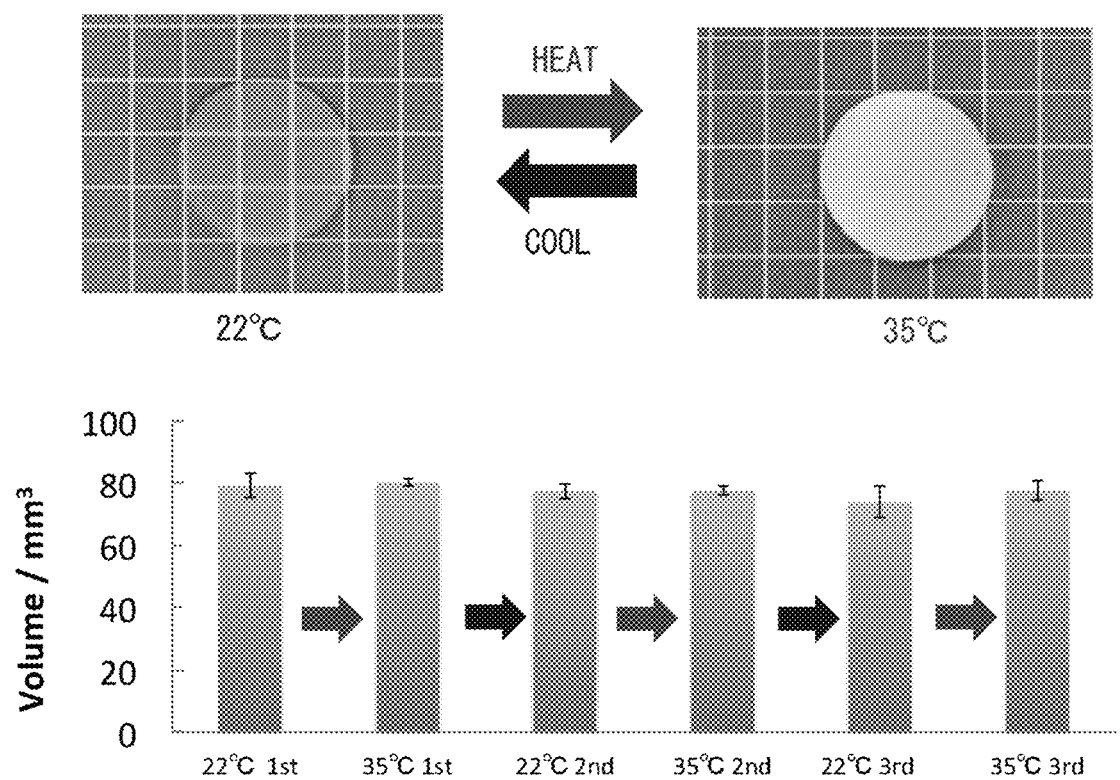
FIG. 13 shows the volume change for 22° C. and 35° C. for the physically crosslinked gel of Example 8.

The volume change at 22° C. and 35° C. is given in FIG. 13. It is shown that there is almost no volume change.

Figure 14:
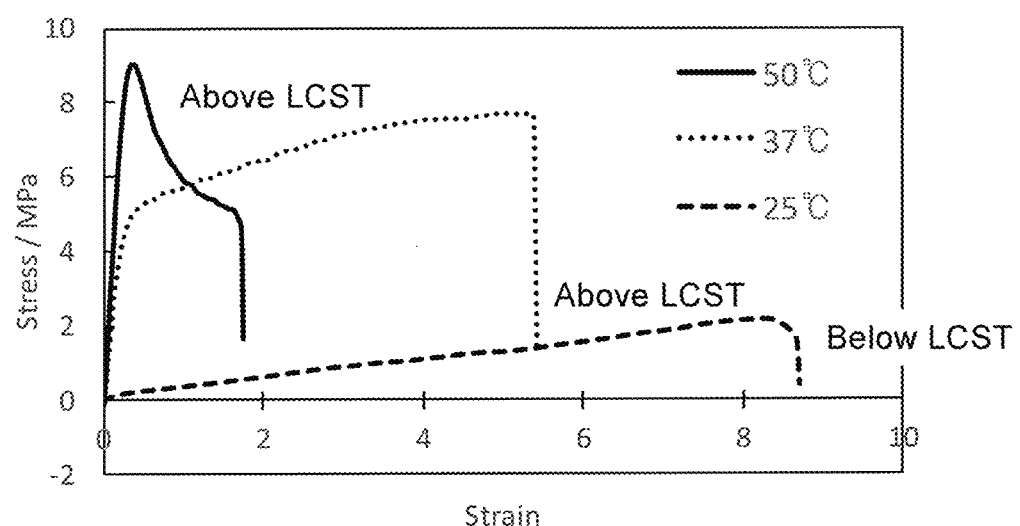
FIG. 14 shows the results of tensile mechanical testing at 25° C., 37° C., and 50° C. for the physically crosslinked gel of Example 8.

The results of tensile mechanical testing at 25° C., 37° C., and 50° C. are given in FIG. 14. It is shown that, at or above the LCST, the strength and toughness are sharply increased, while at a higher temperature the strength Is ultrahigh while the toughness declines.

Figure 15:
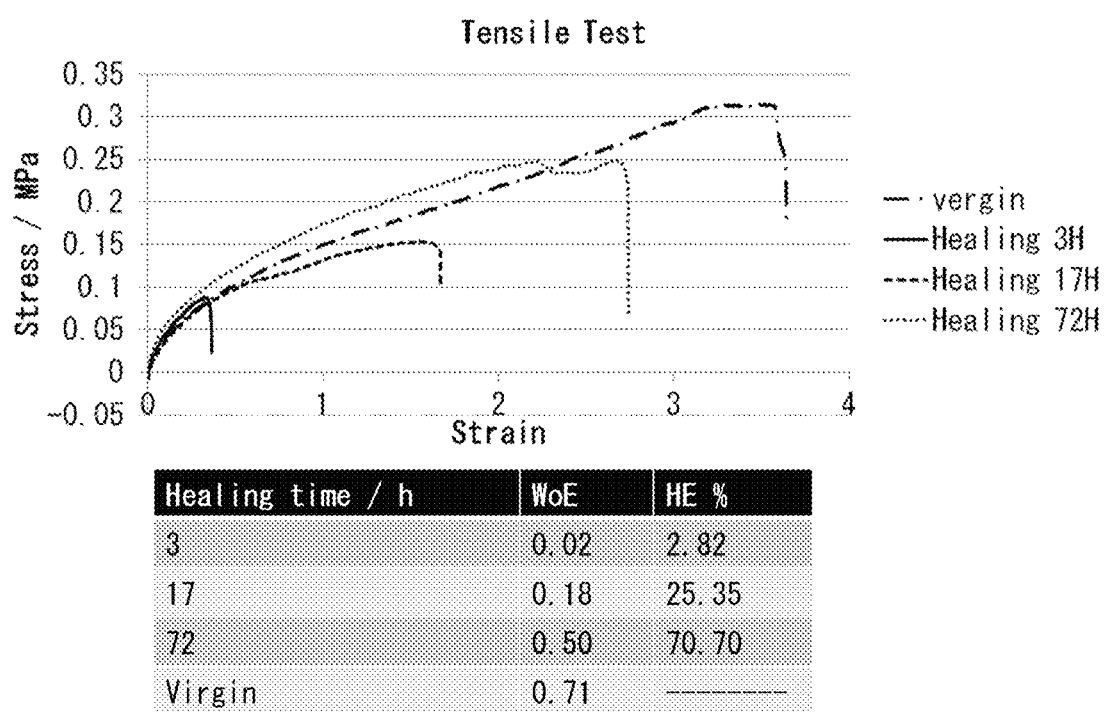
FIG. 15 gives the results of self-healing testing for the physically crosslinked gel of Example 8.

The results of self-healing testing are given in FIG. 15. There is an approximately 70% recovery at 72 hours, and it is thought that complete recovery will finally occur.

Example 9

Figure 29:
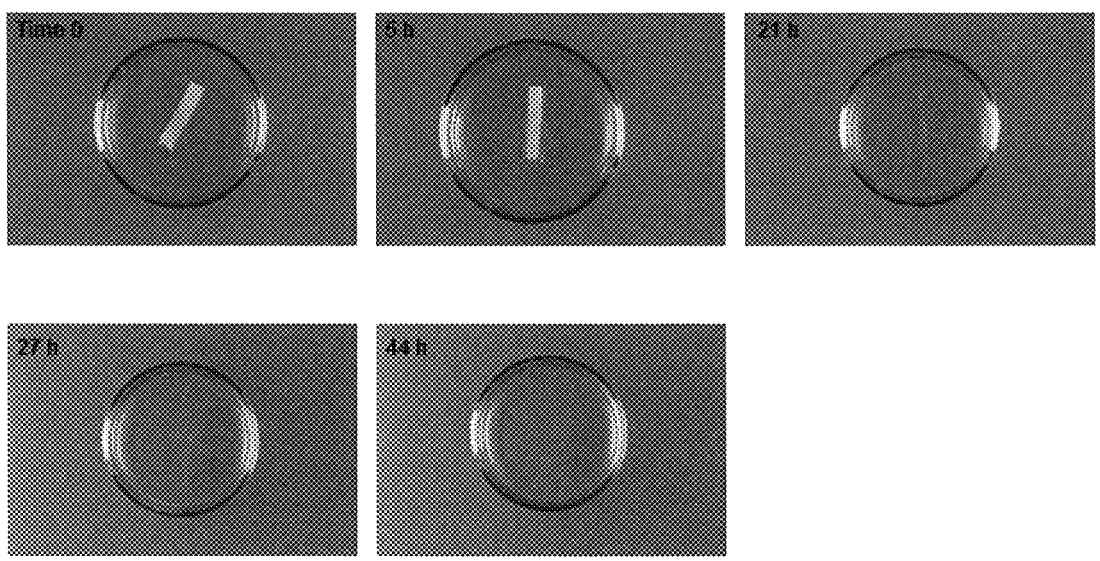
FIG. 29 provides photographs of the timewise change in physiological saline (37° C.) for a test specimen of the 5 M PAAc-400 mM CaAc physically crosslinked hydrogel (LCST=24.0° C.) of Example 9.

The example of a physically crosslinked hydrogel is given.
Polymer: 2 M, 3 M, 4 M, 5 M, and 6 M were used for the monomer concentration, and 0.01 mol % was used for the initiator.
Organic acid salt: immersion was carried out in a 400 mM AcCa aqueous solution.
The Ca concentration (measured by ICP) in the hydrogel is as follows.
2 M:682 mM (27 mg/per 1 g gel)
3 M:804 mM (32 mg/per 1 g gel)
4 M:827 mM (33 mg/per 1 g gel)
5 M:693 mM (28 mg/per 1 g gel)
6 M:514 mM (21 mg/per 1 g gel)
FIG. 29 provides photographs that show the timewise change in physiological saline (37° C.) of a test specimen of the physically crosslinked hydrogel (LCST=24.0° C.) prepared using the aforementioned 5 M PAAc-400 mM CaAc condition. It is shown that this hydrogel dissolves in physiological saline with elapsed time.

Example 10

LCST for Different Polyacrylic Acid Polymer and Calcium Acetate Concentrations

Figure 16:
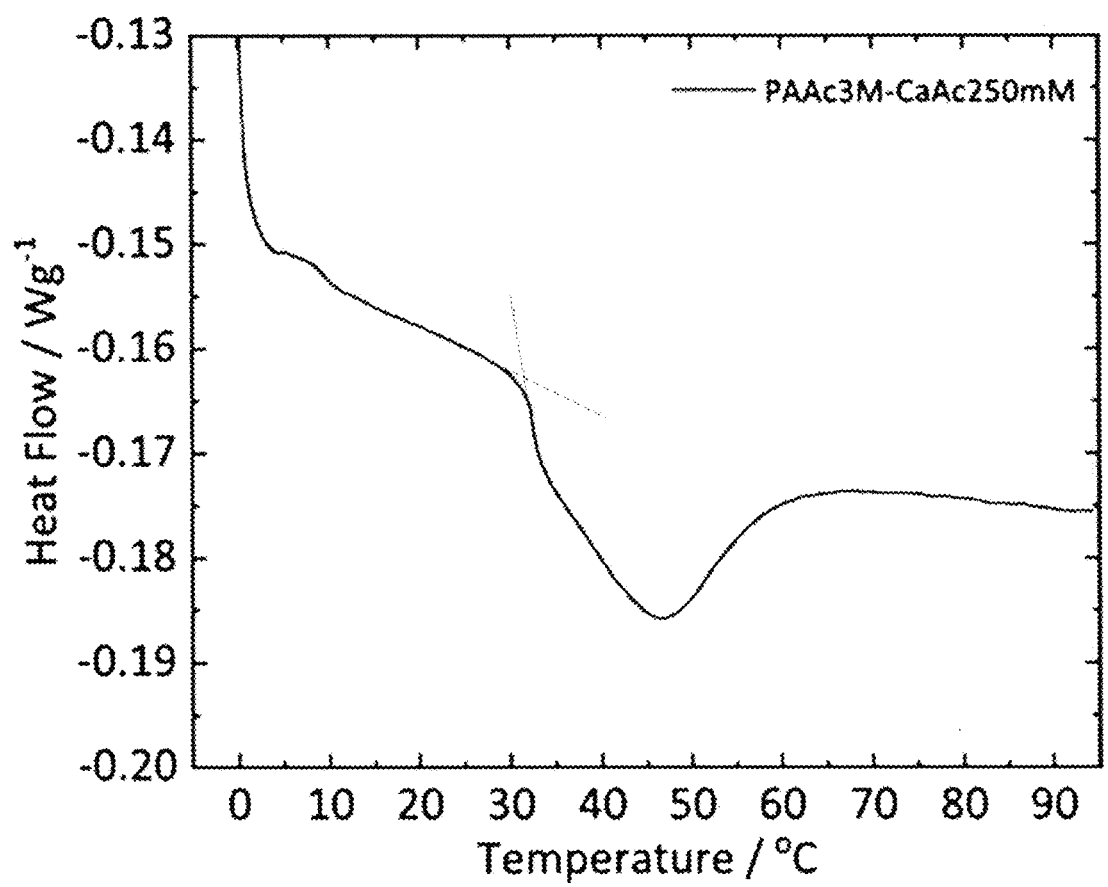
FIG. 16 gives the DSC profile of the 3 M PAAc-250 mM CaAc prepared in Example 10.

The LCST was measured using differential scanning calorimetry (DSC). A small amount of the sample (several tens of milligrams) was introduced into an aluminum pan (container), which was sealed using a tool provided for this purpose. Using air for the reference sample, the temperature was raised from 0° C. to 90° C. at a ramp rate of 3° C./min and the endothermic peak associated with phase separation was measured. FIG. 16 is the DSC profile for a typical polymer (3 M PAAc-250 mM CaAc). The downward peak represents the heat absorption of the sample and corresponds to phase separation. The position of the LCST was determined from the intersection of the two straight lines for the curve segment where the endothermic peak begins.

Figure 17:
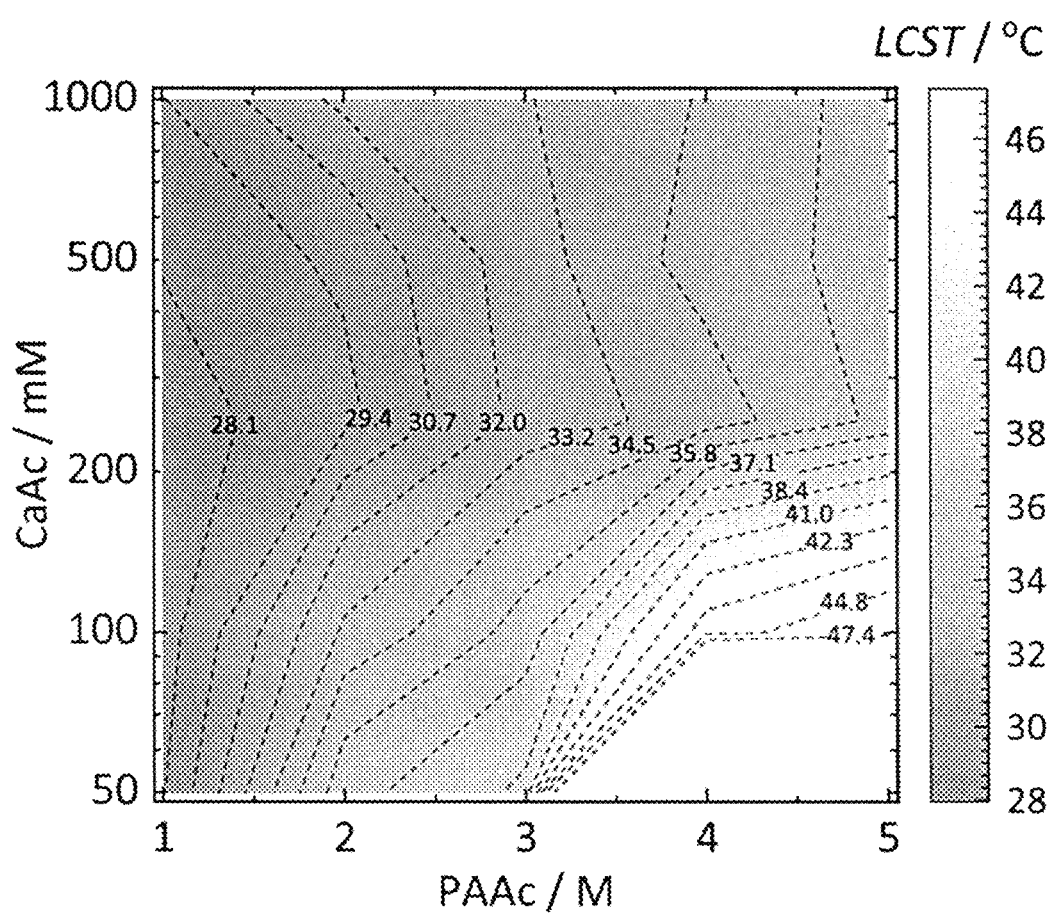
FIG. 17 gives the LCST of the PAAc-CaAc gels prepared in Example 10 using different PAAc concentrations and CaAc concentrations.

FIG. 17 gives the LCSTs for various combinations of PAAc and CaAc concentrations. An increasing trend for the LCST was exhibited as the polymer concentration increased and as the calcium acetate concentration declined. An LCST was not observed in the measurement range for the white region in the lower right (4 M PAAc-50 mM CaAc, 5 M PAAc-50 mM CaAc).

Example 11

Figure 18:
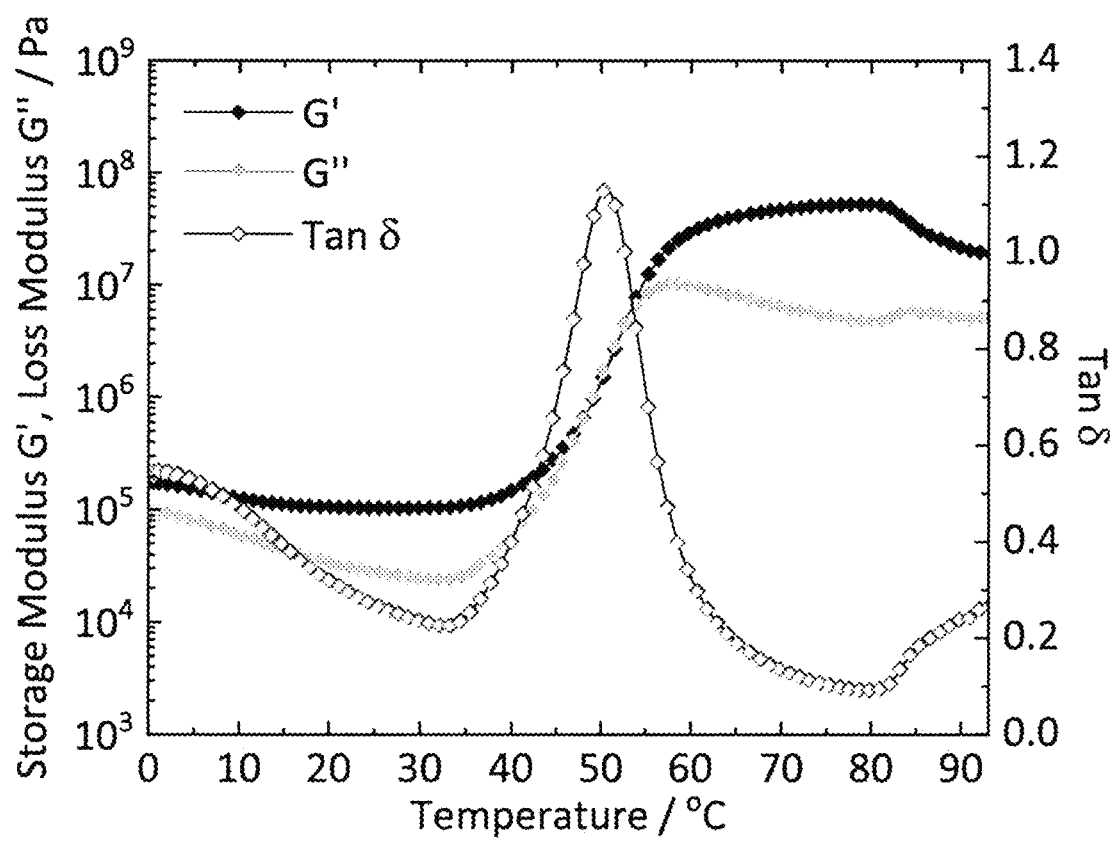
FIG. 18 shows the viscoelastic behavior of the 3 M PAAc-250 mM CaAc gel prepared in Example 11.

HT for Different Polyacrylic Acid Polymer and Calcium Acetate Concentrations
This gel exhibits a phenomenon wherein it abruptly hardens when the temperature is further increased. The temperature when this occurs is called the hardening temperature (HT). The HT was determined using rheometric measurements. Using an instant glue, one side of the gel, which had been molded with a diameter of 15 mm, was attached to the center of a stainless steel parallel plate (pressing horizontal tool) and the opposite side was also attached to a stainless steel rotary container. In order to prevent drying, the container was filled with an aqueous calcium acetate solution having the same concentration as that used for sample preparation. The ramp rate is 3° C./min, the temperature range is from 0° C. to 95° C., the angular velocity for the frequency of the applied shear is 10 rad/s, and the strain is 0.1%. FIG. 18 is the rheometric profile for a typical polymer (3 M PAAc-250 mM CaAc). G' is the storage modulus, which is the elastic component, and G" is the loss modulus, which is the viscous component. Tan δ, known as the loss tangent, is G"/G' and is an index that shows whether a material is elastic or viscous; higher values indicate viscousness. The temperature at the peak for tan δ (around 50° C. in the present case) was taken to be the HT.

Figure 19:
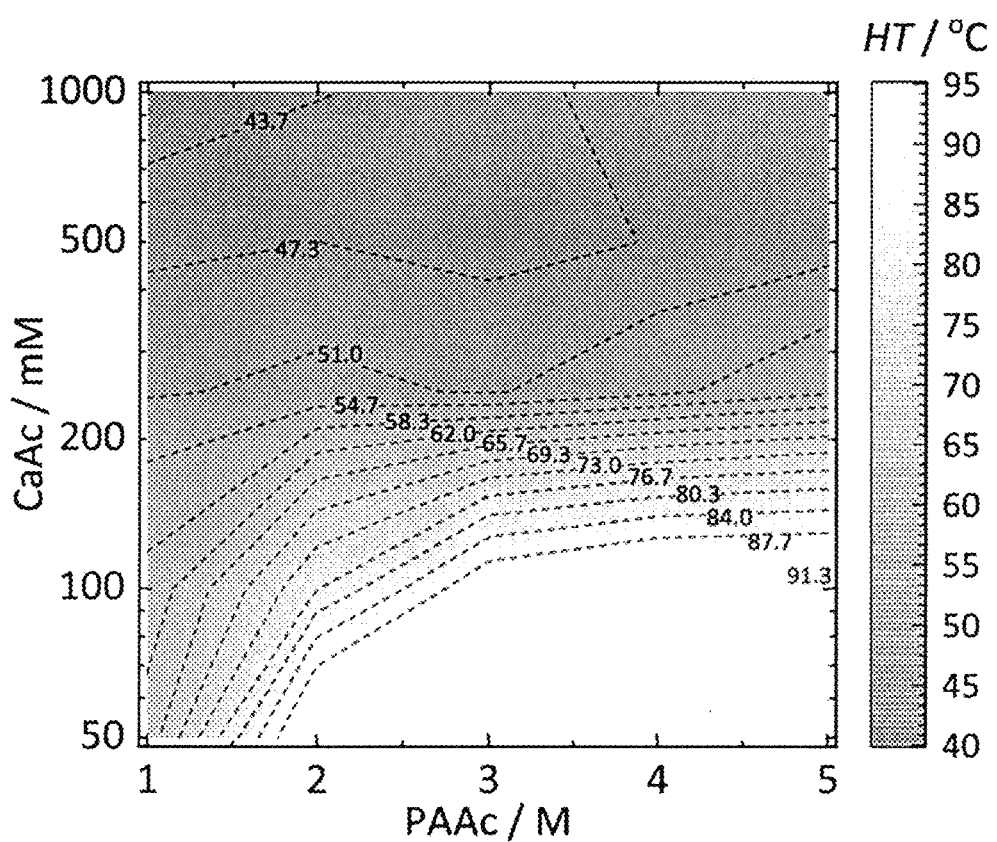
FIG. 19 gives the hardening temperature (HT) of the PAAc-CaAc gels prepared in Example 11 using different PAAc concentrations and CaAc concentrations.

The HTs for various combinations of PAAc and CaAc concentrations are collected in FIG. 19. As for the LCST, the HT presents an increasing trend as the PAAc concentration increases and the CaAc concentration declines. The white region below 91.3° C. in the figure indicates samples for which hardening was not identified in the measurement temperature range.

Figure 20:
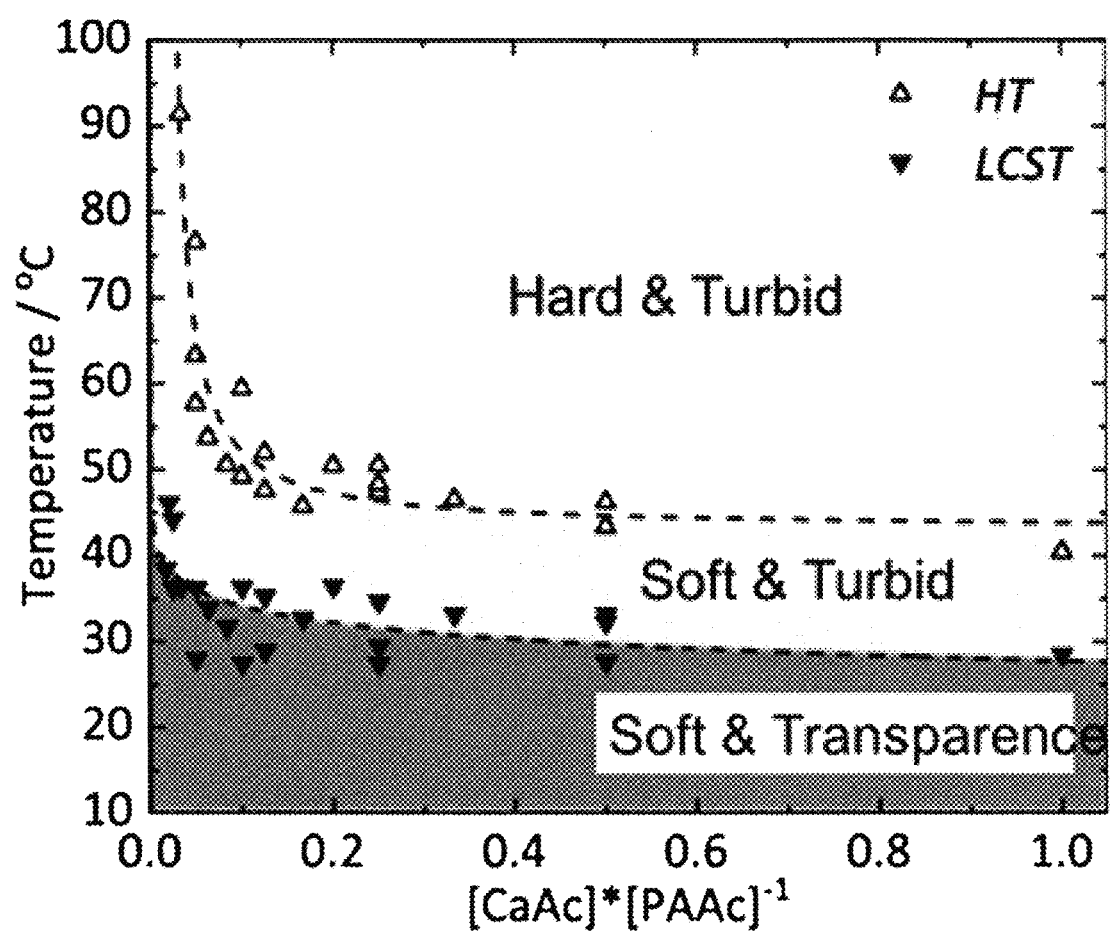
FIG. 20 gives a phase diagram in which the LCSTs of FIG. 17 and the HTs of FIG. 19 have been aggregated into a single diagram.

The preceding LCSTs (FIG. 17) and HTs (FIG. 19) are collected into a single phase diagram in FIG. 20. The horizontal axis is the calcium acetate concentration/polyacrylic acid concentration ratio, which means that the salt concentration declines or the polymer concentration increases as 0 is approached. In the diagram, the inverted filled triangle ▼ refers to the LCST, while the upright open triangle Δ refers to the HT. This diagram shows that, unlike ordinary phase-separated gels, the hydrogel according to the present invention forms three states depending on temperature, i.e., "soft and transparent", "soft and turbid", and "hard and turbid" considered from the low temperature side.

Example 12

Figure 21:
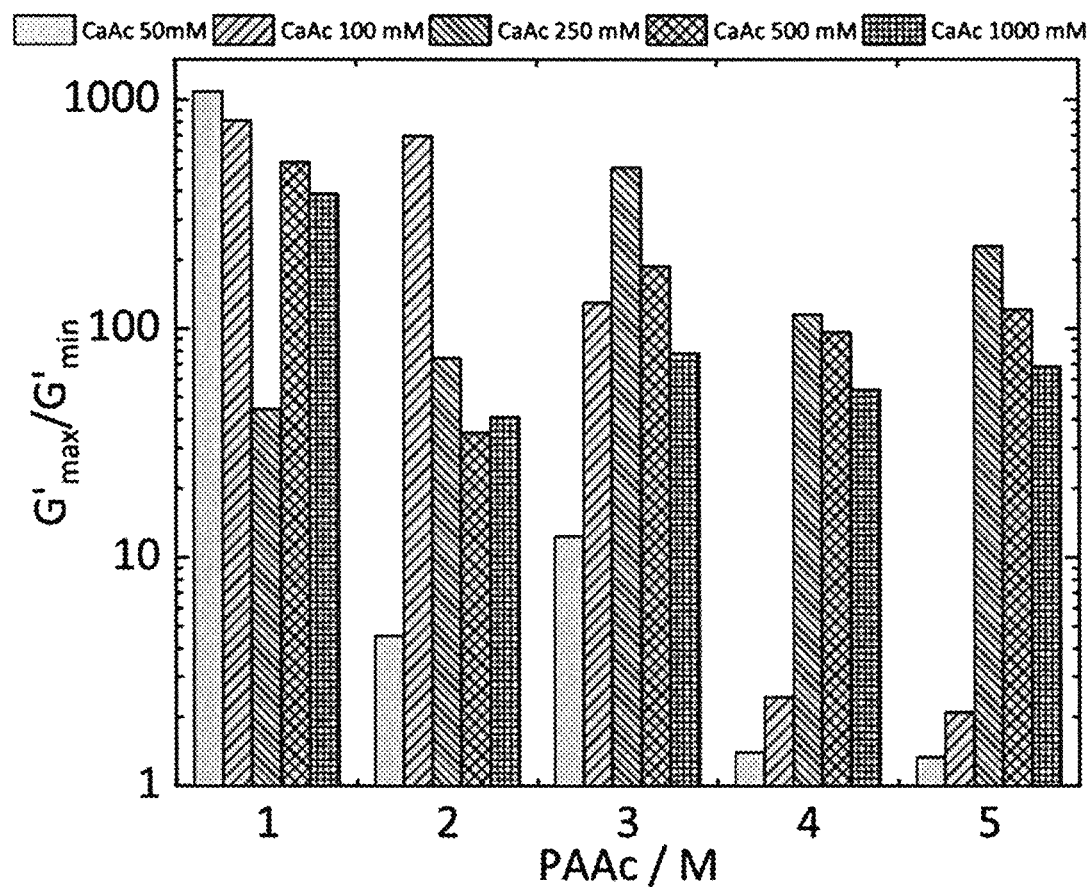
FIG. 21 shows the elastic modulus transition due to heat hardening for Example 12.

Modulus Transition Due to Hardening
In accordance with the rheometric results in FIG. 18, G' undergoes an abrupt increase pre-versus-post-HT, and this is a characteristic feature of the present gel. The extent of the increase in the elastic modulus in comparison to pre-phase separation was evaluated. FIG. 21 gives the ratio between the maximum value and minimum value of G' as determined by rheometry. It is shown that, depending on the composition, an at least 1,000-fold hardening occurs at a maximum. On the other hand, for the samples where an LCST and HT were not observed (for example, 4 M PAAc-50 mM, and 5 M PAAc-50 mM CaAc), almost no change in the elastic modulus is recognized.

Example 13

Frictional Heat Resistance Testing Directed to Heat-Responsive Protector
Utilizing the heat-hardening behavior that is a feature of the hydrogel according to the present invention, the performance as a heat-responsive protector was evaluated. The postulate is protection of the clothing and body from frictional heat caused by, for example, an individual being dragged along the road surface due to, for example, a motorcycle accident.

Figure 22:
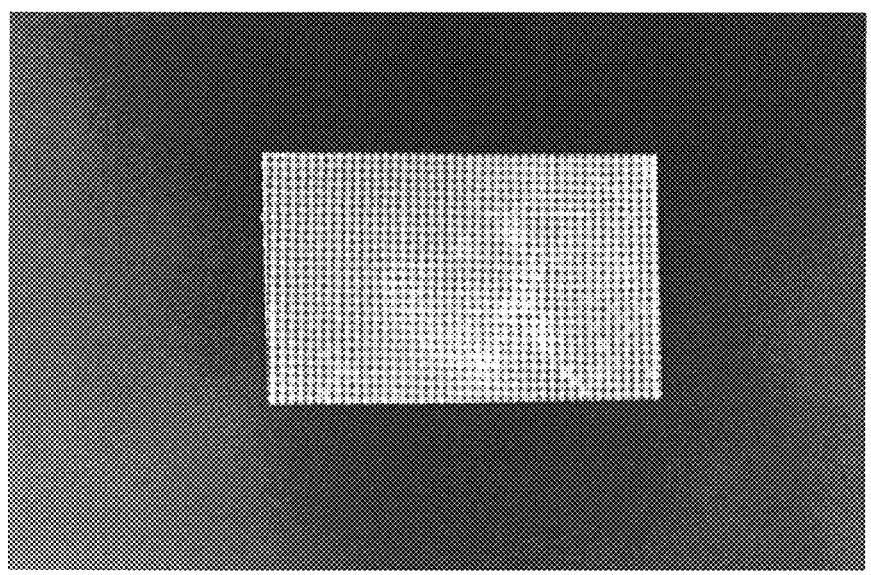
FIG. 22 provides a photograph of a composite material, used in Example 13, of a glass fiber fabric and a PAAc gel according to the present invention.

The evaluation was performed in this test with a composite material provided by the formation of a composite between the hydrogel according to the present invention and a glass fiber fabric (GF). The composite was fabricated as follows: the glass fiber fabric was preliminarily inserted in a reaction cell; hydrogel polymerization was carried out in this reaction cell; and a sample was obtained in which the glass fiber fabric was embedded in the gel provided by the polymerization. The composition of the gel is 5 M AAc, 0.01 mol % MBAA, crosslinking agent, 0.01 mol % α-Keto, initiator. The glass fiber fabric is as follows: E-glass composition, surface density=590 g/m², thickness=0.59 mm, diameter per single glass fiber=14 μm. FIG. 22 is a photograph of the fabricated sample. The following control samples were used for comparison: an "ampholyte gel (PA)-GF" composite material that is tougher than iron (Adv. Funct. Mater. 2017, 27, 1605350), and a "polyacrylamide (PAAm)-GF" composite material between GF and a general weak gel.

Figure 23:
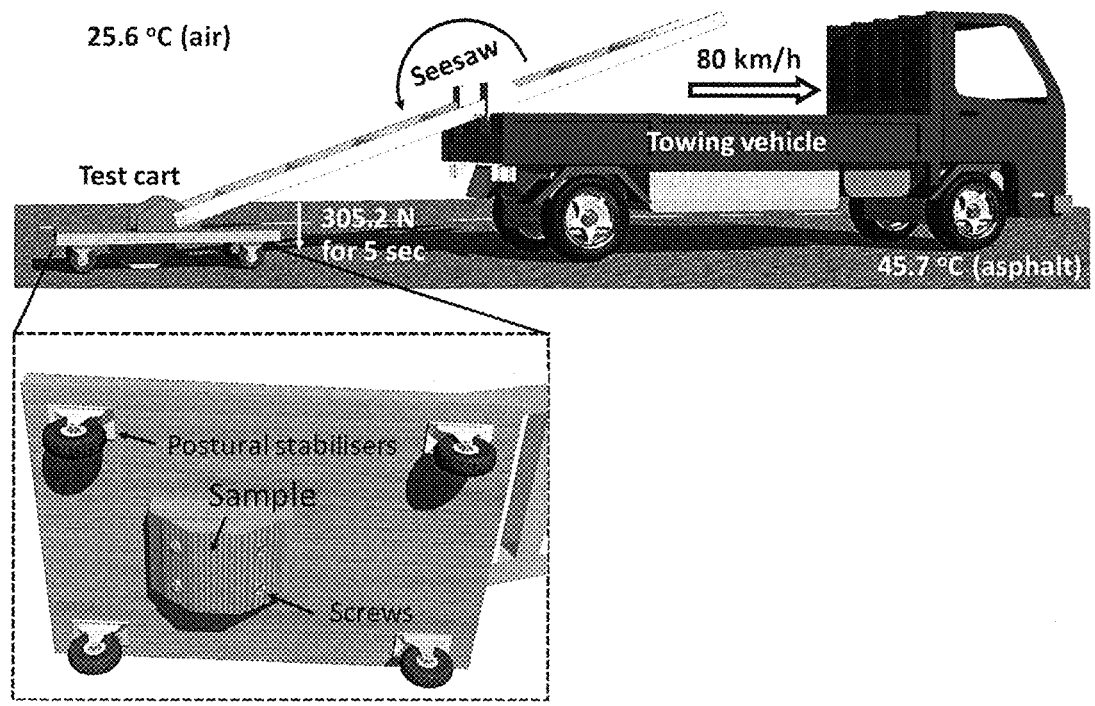
FIG. 23 gives a schematic diagram of the friction test of Example 13.

FIG. 23 is a schematic diagram of the test system. A seesaw is attached to a tow truck, and a test cart for installing the sample is attached to one end. The road surface side of the test cart has a protrusion near the center, to which the four sides of the composite material are attached using four screws. The cart has four auxiliary wheels at the four corners for posture maintenance. When the cart is on the road surface and the posture is maintained, only the sample surface is in contact with the road surface, while the auxiliary wheels are designed to float. Thus, all the load is applied to the sample when the posture is maintained.

The test sequence is as follows. First, the cart is lifted from the road surface by operating the seesaw. While in this state, the tow truck is driven to a speed of 80 km/h (50 mph). While holding this speed, the seesaw is lowered and the sample is pressed against the road surface and the friction test is started. After 5 seconds of test time, the seesaw is raised and the sample is separated from the road surface. The air temperature was 25.6° C. and the road surface temperature was 45.7° C. The temperature decline by the sample after the test was recorded with a thermographic camera, and the temperature immediately after the friction test was determined from Newton's cooling formula, see below, in order to evaluate whether or not hardening due to the frictional heat had occurred.

Figure 24:
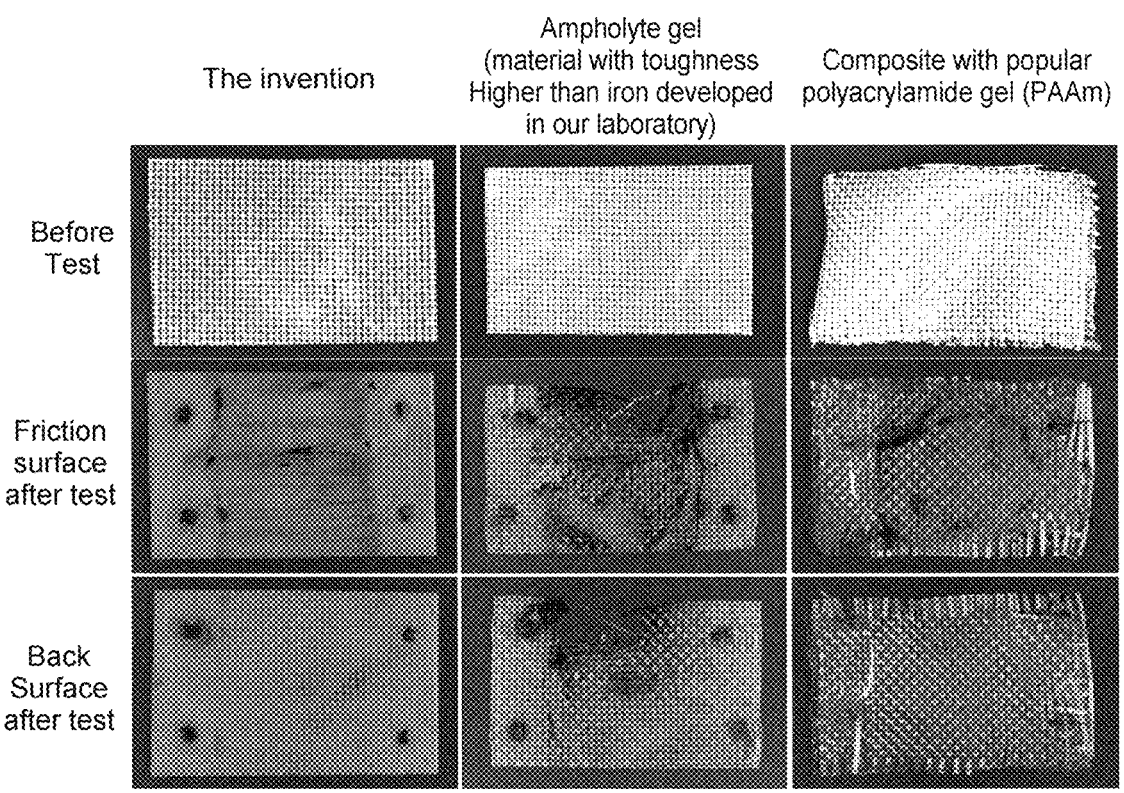
FIG. 24 shows the appearance of the samples before and after the test in Example 13.

FIG. 24 shows the appearance of the samples before and after the friction test. The composite material with the hydrogel of the present invention was white after the test, only small scratches were observed on the surface, and damage to the fiber and back surface was not seen. On the other hand, the PA-GF composite material was highly ruptured to the fiber level. The PAAm-GF appeared unbroken at first glance; however, the regions held by the screws tore at the instant of pressing against the road surface and the sample ended up separating from the test cart, and it was thus weaker.

Figure 25:
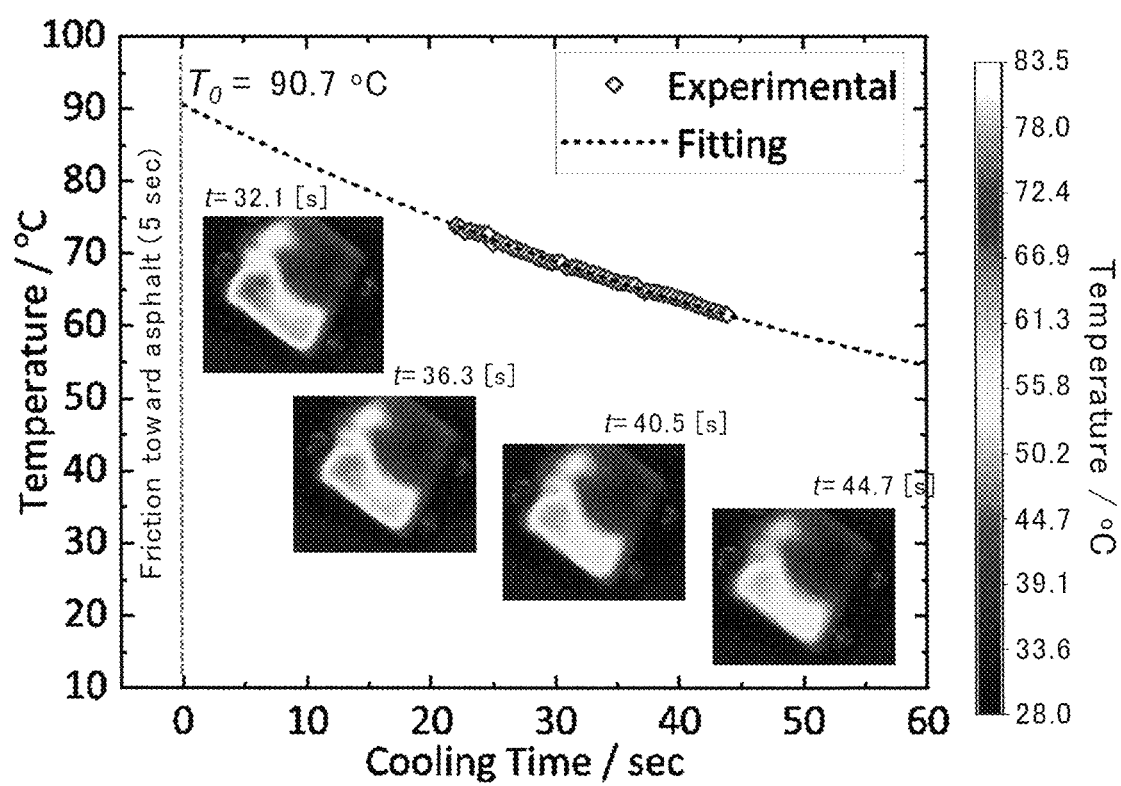
FIG. 25 shows, for Example 13, a graph of temperature decline and temperature mapping using a thermographic camera.

In order to confirm whether the PAAc-GF had undergone heat hardening due to the frictional heat, the temperature of the sample surface immediately after the friction test was determined using Newton's cooling formula. FIG. 25 contains temperature maps of the sample surface provided by a thermographic camera and contains a graph of the temperature drop as determined therefrom. Newton's cooling formula was fit to this data for the temperature drop, and the temperature immediately after the friction test was determined by extrapolation to zero seconds.

Newton's Cooling Formula $$T_t = (T_0 - T_{air})\exp(Kt) + T_{air} \left(K = \frac{\alpha S}{C}\right)$$

$T_t$ is the temperature at t seconds; To is the temperature at zero seconds (start); $T_{air}$ is the temperature of the medium (the temperature of the air in this case, air temperature=25.6° C.); K is a constant composed of the heat transfer coefficient α, the sample area S, and the heat capacity C; and t is time.

Two points of the actually measured thermographic data were inserted and K and $T_O$ were determined from the simultaneous equations to give a surface temperature of 90.7° C. immediately after the friction test. This was higher than the HT (50.6° C.) of the composition of this gel, which suggested that hardening had occurred due to the frictional heat.

Figure 26:
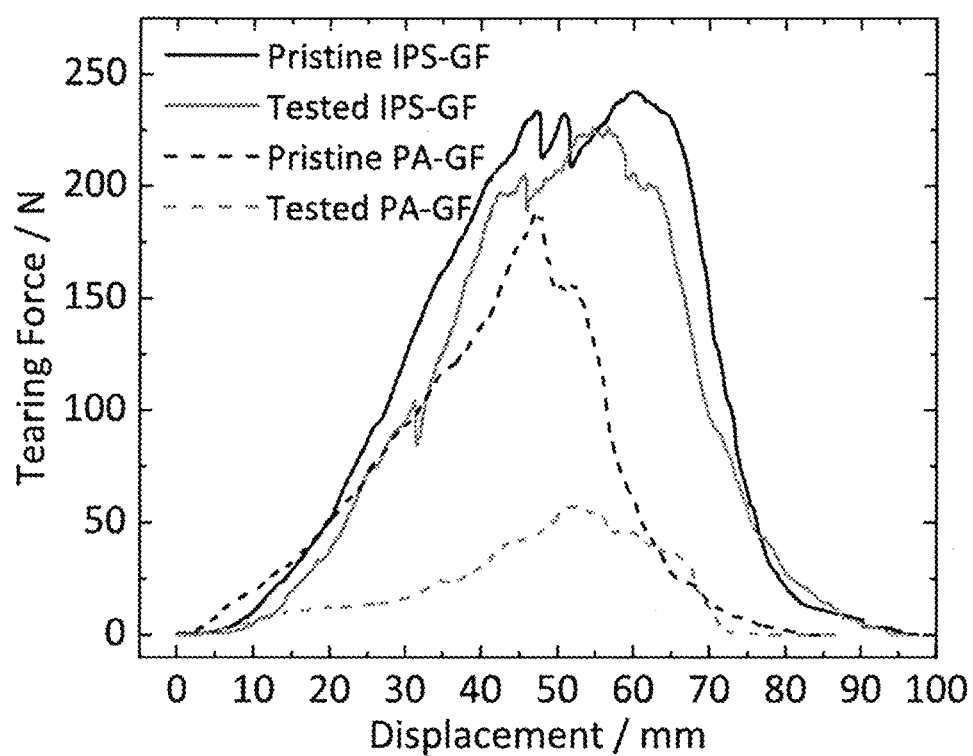
FIG. 26 gives the results of trouser tear testing for Example 13.

The frictional heat resistance was evaluated from the tearing energy determined using a trouser tearing test. A pristine composite material sample prior to the friction test and a sample that had been subjected to the friction test were shaped to a width of 45 mm, a length of 47 mm, and cut length of 20 mm and were subjected to a tearing test with a material tester. Tearing test profiles are provided in FIG. 26, and the tearing energy was determined from the area made by this tearing curve, the sample thickness, and the test length (length−cut length=27 mm).

$$\text{Tearing energy } [kJ/m^2] = \frac{\int_0^L F dL}{L_{thickness} \times L_{bulk}}$$

The $L_{thickness}$ in the denominator is the sample thickness, the $L_{bulk}$ is the test length, and the integral in the numerator is the area made by the x-axis and the curve yielded by the tearing test.

Figure 27:
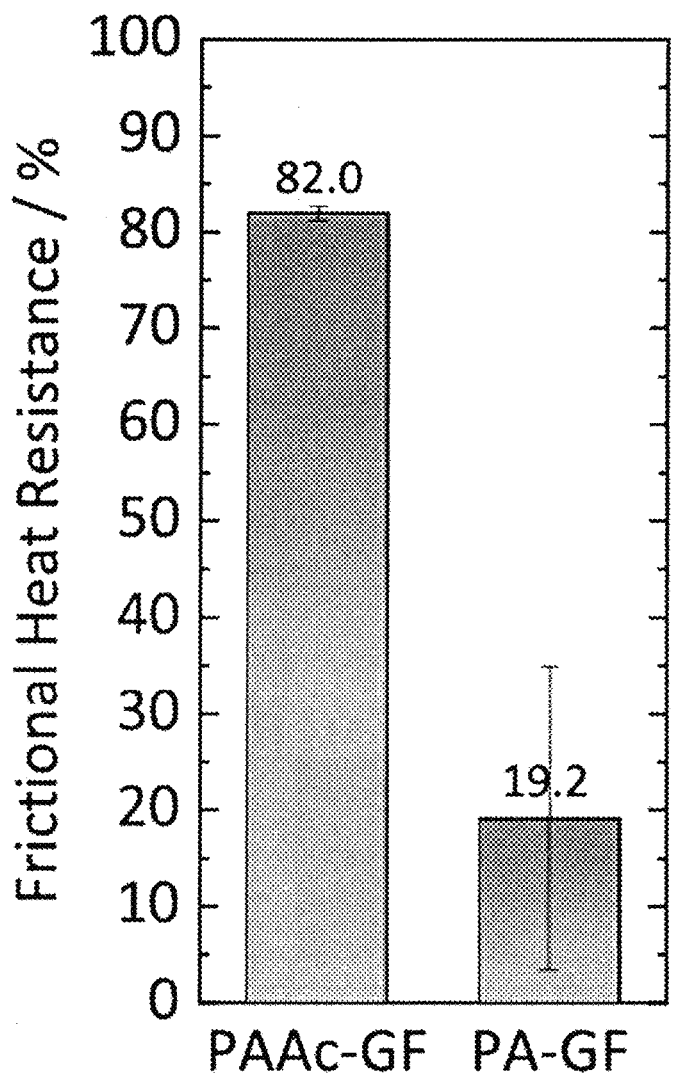
FIG. 27 gives the results of frictional heat resistance testing in Example 13.

The tearing energies were as follows: 235.0±18.4 kJ/m² for the pristine sample (prior to the friction test) of the composite of GF and hydrogel according to the present invention; 192.9±16.8 kJ/m² for this sample after the friction test; 231.9±11.9 kJ/m² for the comparative pristine PA-GF sample; and 45.4±38.9 kJ/m² for this sample after the test. While the pre-test tearing energies were equal, the reduction post-test was shown to be much smaller for the hydrogel according to the present invention than for PA. FIG. 27 contains a graph in which these ratios are designated the frictional heat resistance. Close to 80% of the structure remained undamaged for the GF-hydrogel according to the present invention, while only about 20% remained with the PA-GF.

INDUSTRIAL APPLICABILITY

The present invention is useful in the sectors and fields associated with temperature-responsive polymers.

The invention claimed is:

1. A temperature-responsive hydrogel comprising a carboxyl group-bearing polymer and a divalent metal salt of an organic acid, wherein the temperature-responsive hydrogel has a lower critical solution temperature (LCST) which falls within a range of 10° C. to 80° C.

2. The temperature-responsive hydrogel according to claim 1, wherein the carboxyl group-bearing polymer is a homopolymer of a carboxyl group-bearing monomer or a copolymer of a plurality of monomer species that includes the carboxyl group-bearing monomer.

3. The temperature-responsive hydrogel according to claim 2, wherein the carboxyl group-bearing monomer is at least one selected from the group consisting of acrylic acid, methacrylic acid, itaconic acid, maleic anhydride, maleic acid, fumaric acid, and crotonic acid.

4. The temperature-responsive hydrogel according to claim 3, wherein the homopolymer of a carboxyl group-bearing monomer is a polyacrylic acid or a polymethacrylic acid.

5. The temperature-responsive hydrogel according to claim 2, wherein the copolymer is a copolymer of a carboxyl group-bearing monomer and a monomer other than a carboxyl group-bearing monomer, and the monomer constituting the copolymer other than a carboxyl group-bearing monomer is at least one selected from the group consisting of acrylate monomers, esters of $\alpha,\beta$-ethylenically unsaturated carboxylic acids, hydroxyalkyl esters of $\alpha,\beta$-ethylenically unsaturated carboxylic acids, alkoxyalkyl esters of $\alpha,\beta$-ethylenically unsaturated carboxylic acids, acrylamide monomers, and styrenic monomers.

6. The temperature-responsive hydrogel according to claim 2, wherein equal to or more than 50% as a molar ratio of the copolymer is derived from carboxyl group-bearing monomer.

7. The temperature-responsive hydrogel according to claim 1, wherein the polymer includes carboxyl groups in an amount ranging from 0.001 to 0.05 mol/g.

8. The temperature-responsive hydrogel according to claim 1, wherein the carboxyl group-bearing polymer has a crosslinked structure.

9. The temperature-responsive hydrogel according to claim 8, wherein the crosslinked structure is a chemically crosslinked structure and/or a physically crosslinked structure.

10. The temperature-responsive hydrogel according to claim 1, wherein the organic acid is at least one organic acid selected from the group consisting of formic acid, acetic acid, and propionic acid.

11. The temperature-responsive hydrogel according to claim 1, wherein the divalent metal is an alkaline-earth metal.

12. The temperature-responsive hydrogel according to claim 1, wherein the polymer includes the divalent metal salt of an organic acid at a concentration ranging from 50 mM to the saturation concentration.

13. The temperature-responsive hydrogel according to claim 1, wherein the temperature-responsive hydrogel is transparent at a temperature below the LCST and is in a turbid state at a temperature above the LCST.

14. A method for producing a temperature-responsive hydrogel, comprising immersing a carboxyl group-bearing polymer in an aqueous solution of a divalent metal salt of an organic acid, wherein the temperature-resistant hydrogel comprises a carboxyl group-bearing polymer and a divalent metal salt of an organic acid, and has a lower critical solution temperature (LCST) which falls within a range of 10° C. to 80° C.

15. The production method according to claim 14, wherein the aqueous solution of a divalent metal salt of an organic acid contains the divalent metal salt of an organic acid in an amount ranging from 50 mM to the saturation concentration.

* * * * *